(12) United States Patent
Srivastava et al.

(10) Patent No.: US 11,577,688 B2
(45) Date of Patent: Feb. 14, 2023

(54) SMART WINDOW APPARATUS, SYSTEMS, AND RELATED METHODS FOR USE WITH VEHICLES

(71) Applicant: TOYOTA MOTOR ENGINEERING & MANUFACTURING NORTH AMERICA, INC., Plano, TX (US)

(72) Inventors: Abhishek Srivastava, Ann Arbor, MI (US); David W. Cosgrove, Milford, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 189 days.

(21) Appl. No.: 17/097,102

(22) Filed: Nov. 13, 2020

(65) Prior Publication Data
US 2022/0153227 A1    May 19, 2022

(51) Int. Cl.
| | |
|---|---|
| *B60R 25/01* | (2013.01) |
| *B60R 25/31* | (2013.01) |
| *B60H 1/26* | (2006.01) |
| *B60R 25/102* | (2013.01) |
| *B60R 25/32* | (2013.01) |

(52) U.S. Cl.
CPC ............ *B60R 25/01* (2013.01); *B60H 1/265* (2013.01); *B60R 25/102* (2013.01); *B60R 25/31* (2013.01); *B60R 25/32* (2013.01)

(58) Field of Classification Search
CPC .... G08B 21/22; G08B 21/24; G08B 21/0205; B60W 40/08; B60W 2040/0881; B60H 1/00742; B60H 1/00821; B60Q 9/001
USPC ......................................................... 348/148
See application file for complete search history.

(56) References Cited

U.S. PATENT DOCUMENTS

| | | | |
|---|---|---|---|
| 6,922,622 B2 | 7/2005 | Dulin et al. | |
| 7,109,861 B2 | 9/2006 | Rao | |
| 8,836,491 B2 | 9/2014 | Rao et al. | |
| 9,123,244 B2 | 9/2015 | Daman et al. | |
| 9,378,641 B2 | 6/2016 | Beumler | |
| 9,676,325 B1 | 6/2017 | Duan et al. | |
| 9,758,016 B1 | 9/2017 | Baron et al. | |
| 9,845,050 B1 * | 12/2017 | Garza ............... | G08B 21/0205 |
| 10,131,323 B1 * | 11/2018 | Sterling ................ | B60R 25/01 |
| 10,297,130 B2 | 5/2019 | Friedman | |

(Continued)

FOREIGN PATENT DOCUMENTS

| | | |
|---|---|---|
| DE | 10 2018 004 015 A1 | 11/2018 |
| JP | 2004306780 A * | 11/2004 |
| KR | 10-2016-0045260 A | 4/2016 |

*Primary Examiner* — Nathnael Aynalem
(74) *Attorney, Agent, or Firm* — Oblon, McClelland, Maier & Neustadt, L.L.P.

(57) ABSTRACT

Smart window apparatus, systems, and related methods for use with vehicles are disclosed. A disclosed apparatus includes control circuitry configured to obtain data associated with a vehicle that is parked, determine, based on the data, a status of the vehicle associated with relatively high cabin temperature or an unattended occupant in the vehicle, and open a vehicle window via a window actuator to cool the vehicle cabin. The control circuitry is also configured to detect, based on the data, an event in an environment associated with the vehicle while the vehicle window is open and adjust the vehicle window via the window actuator in response to the detection.

15 Claims, 14 Drawing Sheets

(56) References Cited

U.S. PATENT DOCUMENTS

| | | | |
|---|---|---|---|
| 10,576,809 B2* | 3/2020 | Lota | B60Q 1/50 |
| 2006/0179853 A1* | 8/2006 | Vosburgh | B60H 3/0085 |
| | | | 62/126 |
| 2007/0046451 A1* | 3/2007 | Bihya | G08B 21/22 |
| | | | 180/271 |
| 2007/0152615 A1* | 7/2007 | Newman | E05F 15/40 |
| | | | 318/481 |
| 2014/0214241 A1 | 7/2014 | Ramamoorthy et al. | |
| 2016/0272112 A1 | 9/2016 | Degrazia et al. | |
| 2018/0105104 A1 | 4/2018 | Smith | |
| 2018/0312033 A1* | 11/2018 | Chu | H04W 4/90 |
| 2019/0057596 A1 | 2/2019 | Desai | |
| 2020/0398637 A1* | 12/2020 | Chang | G08B 21/22 |

\* cited by examiner

SMART WINDOW APPARATUS, SYSTEMS, AND RELATED METHODS FOR USE WITH VEHICLES

FIELD OF THE DISCLOSURE

This disclosure relates generally to vehicles and, more particularly, to smart window apparatus, systems, and related methods for use with vehicles.

BACKGROUND

An interior or cabin space of a vehicle can get relatively hot while the vehicle is parked outside (e.g., in direct sunlight), which may be undesirable to a driver or vehicle owner returning to the vehicle and/or pose risks to an unattended occupant in the vehicle, such as a child or pet. Typically, a Heating Ventilation and Air Conditioning (HVAC) system and/or an automatic climate control system can be employed to facilitate cooling the cabin space when the vehicle is turned on.

SUMMARY

An aspect of the present disclosure includes an apparatus including control circuitry configured to obtain data associated with a vehicle that is parked, determine, based on the data, a status of the vehicle associated with relatively high cabin temperature or an unattended occupant in the vehicle, and open a vehicle window via a window actuator to cool the vehicle cabin. The control circuitry is also configured to detect, based on the data, an event in an environment associated with the vehicle while the vehicle window is open and adjust the vehicle window via the window actuator in response to the detection.

Another aspect of the present disclosure includes an apparatus including control circuitry configured to detect a cabin temperature of a vehicle that is stationary via one or more sensors and open, via an actuator, a window of the vehicle when the cabin temperature is greater than a threshold temperature. The control circuitry is also configured to obtain data corresponding to an environment associated with the vehicle while the window is open and adjust, via the actuator, the window in real-time based on the data.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Figure 1A:
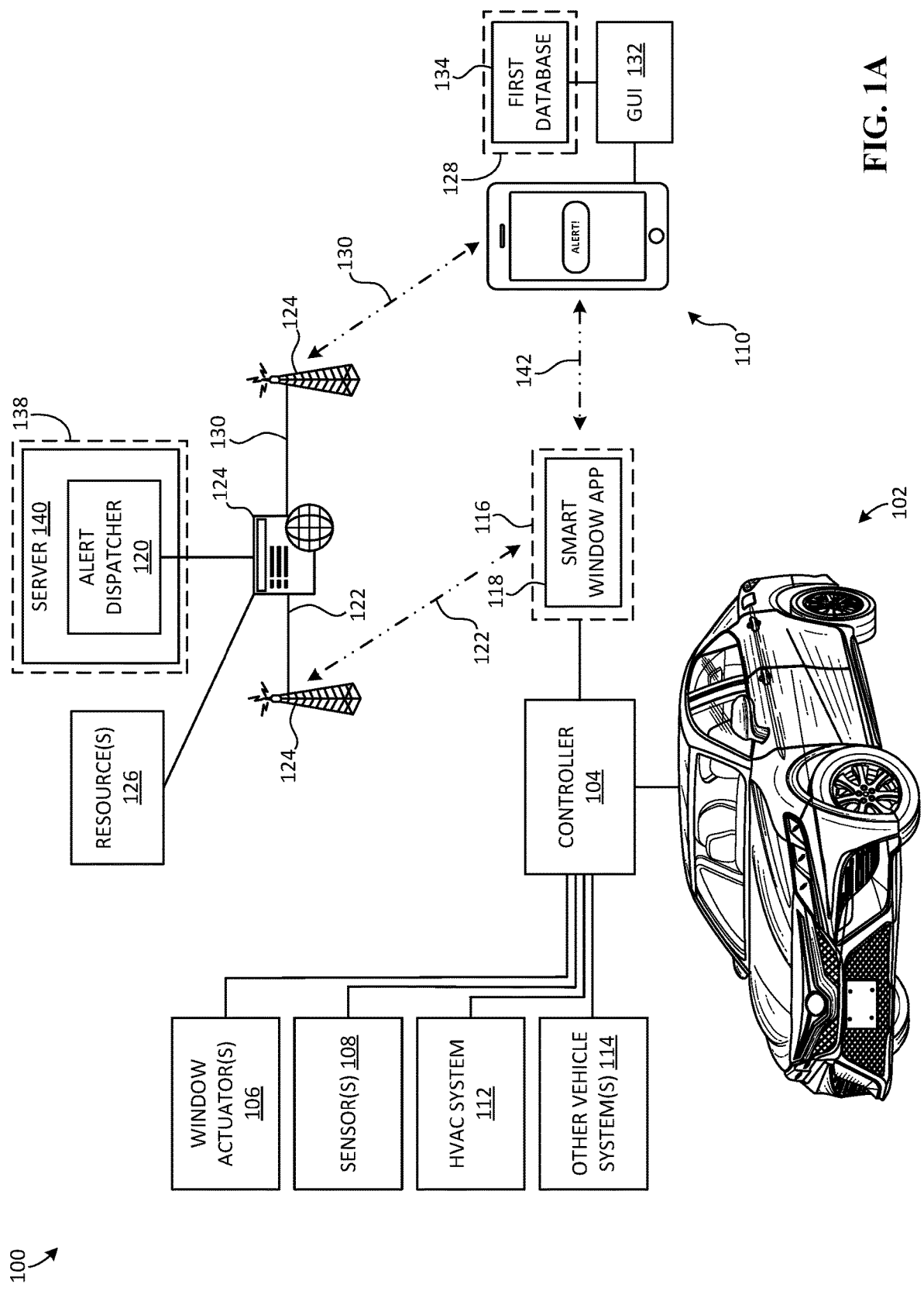
FIG. 1A illustrates a schematic diagram of an example system including an example vehicle and an example user device for interacting with a cloud-based alert application in accordance with the teachings of this disclosure.

Smart window apparatus, systems, and related methods for use with vehicles are disclosed. Disclosed examples provide an effective solution for venting (e.g., actively venting) a cabin of a parked vehicle while the vehicle is soaking and/or receiving a thermal load from an external source (e.g., the sun, ambient air, etc.). Generally speaking, when a person enters a hot vehicle cabin and activates an in-vehicle HVAC system to rapidly cool the cabin, the resulting HVAC system or compressor load can be relatively high. An HVAC system load for a vehicle is substantially based on ambient temperature inside a vehicle cabin. As will be discussed in greater detail below, examples disclosed herein advantageously open (e.g., partially or fully roll down) one or more windows of the parked vehicle in certain scenarios associated with relatively high cabin temperature to cool a cabin of the vehicle (e.g., while the vehicle is off). By cooling a hot vehicle cabin in such a manner, examples disclosed herein substantially reduce a subsequent HVAC system load provided when a driver or vehicle owner returns to and/or turns on the vehicle, which can improve fuel economy of the vehicle as well as allow for a smaller, more light-weight HVAC system having a lower overall capacity to be used in the vehicle. Further, examples disclosed herein also reduce related greenhouse gas (GHG) emission and can improve life and/or longevity of the HVAC system.

Additionally or alternatively, examples disclosed herein can be used in connection with improving vehicle safety with respect to an occupant (e.g., any of a child, a pet, etc.) left unattended in a vehicle. In any case, certain data of interest associated with a vehicle of interest is received and/or analyzed (e.g., via an on-board vehicle controller and/or a cloud-based platform), for example, to determine whether (a) a driver or owner (i.e., a user) of the vehicle likely requires assistance in cooling the cabin of the vehicle, (b) the occupant is unattended in the vehicle, and/or (c) certain advantageous action(s) should be taken. The analyzed data includes, for example, sensor data received from one or more vehicle sensors, such as any of an ignition state sensor, a temperature sensor, a global position system (GPS)

locator, a seat weight sensor, a seat belt sensor, a camera, a light detection and ranging (LiDAR) sensor, a microphone, and the like. Further, at least some of the data can be received from one or more systems and/or other devices of the vehicle, such as any of an electronic control unit (ECU) (e.g., an engine ECU), an HVAC system, a GPS, a camera system, a LiDAR system, an active noise cancelling (ANC) system, and the like. Further still, in some examples (e.g., where the vehicle is a connected vehicle), at least some of the data can be received from one or more resources (e.g., a database associated with a weather service provider, a web-based application, big data sources, etc.) that are external to the vehicle and accessible via one or more wireless and/or web-based communication networks. In particular, if a certain usage condition or status of the vehicle is detected based on the data, a user of the vehicle (e.g., the owner or driver) may be alerted and/or notified with respect to the detected status of the vehicle, and/or at least one window of the vehicle is opened to cool the cabin before the user returns to the vehicle.

A customer or user interested in actively cooling and/or monitoring their parked vehicle can interact with an example smart window application (e.g., a cloud application), for example, via a mobile or electronic device (e.g., any of a smartphone, a tablet, a smart key fob, etc.). Such an electronic device can enable the user, for example, to (a) view notifications or information related to the detected status of their vehicle and/or (b) select one or more options related to cooling the cabin of the vehicle and/or providing aid to the unattended occupant. In some examples, interactive reports or notifications are generated and provided to the user to facilitate decisions and/or selections made by the user. An interactive notification may include certain information associated with the vehicle such as, for example, a detected cabin temperature, weather conditions for the location of the vehicle, relative safety of an area in which the vehicle is parked, and the like. In such examples, the interactive notification includes response options that the user can select upon receiving the alert, such as permitting the smart window application to: (a) open the window(s), (b) activate the HVAC system, (c) turn on the vehicle 102, and/or (d) contact emergency services (e.g., if an unattended occupant is detected). Additionally, the user can interact with the smart window application via the electronic device to view, manage, and/or set preferences or settings of the application. For example, a preference or setting of the application may relate to automatically opening the window(s) or requesting permission from the user to open the window(s) upon detecting the status of the vehicle. In another example, an additional preference or setting of the application may relate to user designated areas (e.g., low crime areas) in which the application is permitted to open the vehicle window(s).

While the cabin of the vehicle is venting (i.e., at least one window is open), the disclosed application monitors an environment (e.g., an external environment) associated with the vehicle to provide one or more real-time window adjustments. For example, data corresponding to the environment (e.g., camera data, LiDAR data, weather information for a location of the vehicle, and the like) is received and analyzed repeatedly and/or continuously. In particular, the disclosed application is configured to control one or more of the windows of the vehicle in substantially real-time based on the data. More particularly, certain events and/or changes in the environment can be detected by the smart window application, wherein closing or adjusting one or more windows of the vehicle would be advantageous. In some examples, the window(s) of the vehicle can be closed (e.g., partially or fully rolled up) when a certain detected weather event that may adversely affect a vehicle interior is occurring or will occur imminently. The detected weather event could be, for example, a dust or sand storm, rain, and the like, where certain environmental elements (e.g., any of dust, dirt, sand, water, etc.) are airborne and/or substantially present in the environment, which can wear and/or degrade a vehicle interior that is exposed to the environment. In other examples, the window(s) of the vehicle can be closed when a detected object of interest is approaching the vehicle and/or is within relatively close proximity to the vehicle. The object of interest could be a person who is not authorized to drive or enter the vehicle, or the object of interest could be a relatively small animal or critter capable of climbing through an open vehicle window. As a result, examples disclosed herein effectively protect the vehicle and/or the occupant in the vehicle while the cabin is venting.

As previously mentioned, at least one window of a vehicle of interest may be opened in response to detecting the usage condition or status, which allows ambient air to flow through the open window and into a cabin of the vehicle. In some examples, multiple (e.g., all) windows of the vehicle are opened to increase airflow through the cabin. In such examples, the windows of the vehicle may be adjusted based on one or more detected wind parameters (e.g., any of wind direction, wind speed, etc.) and a detected orientation of the vehicle to optimize airflow through the cabin. Additionally or alternatively, if the weather event is occurring, the window(s) of the vehicle may be adjusted based on the detected wind parameter(s) and the orientation of the vehicle to prevent the environmental elements from passing through an open window, while allowing at least some ambient air to flow into the cabin. For example, if the wind is blowing the environmental elements onto a first side of the vehicle, all open vehicle window(s) on or associated with the first side can be fully rolled up by the smart window application, and one or more open vehicle windows on or associated with a second side of the vehicle opposite to the first side can be left in position.

In some examples, certain data associated with the user is received and analyzed to determine when the user is likely to drive the vehicle. For example, based on driving habits of the user and/or vehicle usage patterns, the disclosed application determines or predicts one or more times at which the user will drive the vehicle (e.g., for commuting to and/or from work). In such examples, the smart window application can alert and/or notify the user at a time before the user returns to the vehicle, which gives the application sufficient time to cool the vehicle cabin and improve comfort of the user.

FIG. 1A illustrates a schematic diagram of an example system 100 in which examples disclosed herein can be implemented. According to the illustrated example of FIG. 1A, the system 100 includes at least one example vehicle (e.g., a motor vehicle) 102 such as, for example, one of a car, a truck, a van, a sport utility vehicle (SUV), and the like. The system 100 also includes an example controller 104, one or more example window actuators 106, and one or more example sensors 108, each of which is operatively coupled to the vehicle 102 in the illustrated example. In certain scenarios (e.g., when a vehicle cabin is relatively hot while the vehicle 102 is parked and/or an occupant is left unattended in the vehicle 102), the controller 104 of FIG. 1A controls the window actuator(s) 106 to open (e.g., partially or fully roll down) one or more windows of the vehicle 102, thereby venting and/or cooling a cabin of the vehicle 102. Additionally, while the window(s) of the vehicle 102 is/are open, the controller 104 of FIG. 1A is configured to monitor (e.g., via the sensor(s) 108) an environment associated with the vehicle 102 and provide one or more real-time window adjustments, which will be discussed in greater detail below. The environment can include, for example, an environment external to the vehicle 102 and/or surroundings of the vehicle 102.

In some examples, during cabin venting, the controller 104 of FIG. 1A can utilize the sensor(s) 108 to detect a certain event in the environment, such as an object of interest (e.g., any of an animal or critter, a person not authorized to use the vehicle 102, and the like) approaching the vehicle 102. In response, the controller 104 adjusts (e.g., closes), via the window actuator(s) 106, the window(s) of the vehicle 102 in real-time based on obtained sensor data corresponding to the environment. The event could also be, for example, a detected change in the weather that may adversely affect an interior of the vehicle 102 if the window(s) is/are maintained in an open state, such as the formation of a dust or sand storm, rain, etc. In other examples, the controller 104 can optimize airflow in the cabin of the vehicle 102 by adjusting the window(s) based on one or more detected wind parameters (e.g., any of wind speed, direction, etc.) and/or a detected orientation of the vehicle 102. In any case, the controller 104 of FIG. 1A can be provided with particular computer logic to achieve functionality disclosed herein, as discussed further below.

In FIG. 1A, the window actuator(s) 106 facilitate opening and closing one or more windows of the vehicle 102 and/or precisely controlling movement thereof. The window actuator(s) 106 of FIG. 1A can be implemented, for example, using one or more motors (e.g., electric motors) and the like and/or any other suitable actuator device(s). Each window actuator 106 can be operatively coupled to a certain window of the vehicle, for example, via a regulator assembly that may be positioned in a vehicle door, wherein output generated by the window actuator 106 is transmittable through the regulator assembly from the window actuator 106 to the window. Further, each of the window actuator(s) 106 of FIG. 1A can be connected to the controller 104 and/or a power source (e.g., a vehicle battery).

Prior to opening the window(s) of the vehicle 102, the controller 104 may communicate with a first or primary user device (e.g., an electronic device such as a smartphone, a tablet, a laptop, etc.) 110 with a condition or status of the vehicle 102 detected by the controller 104. In some examples, the controller 104 of FIG. 1A is configured to send and/or transmit an alert to the primary user device 110, for example, via a cloud-based communication system. Additionally or alternatively, the controller 104 of FIG. 1A can be configured to send and/or transmit the alert directly to the primary user device 110, for example, using Bluetooth connectivity and the like and/or any other short-range communication methods or techniques.

The vehicle 102 of FIG. 1A may be provided with an example bus (e.g., a controller area network (CAN) bus), which enables effective communications and/or interactions between different electronic components of the vehicle 102. As such, the vehicle 102 of FIG. 1A may also be provided with one or more appropriate vehicle systems and/or vehicle electronic devices that can communicate with each other via the bus (e.g., broadcast messages over the bus). In some examples, the vehicle 102 includes an example HVAC system 112, which may be controlled by the controller 104 in certain scenarios to facilitate cooling the cabin of the vehicle 102. Additionally or alternatively, the vehicle 102 includes one or more other vehicle systems 114 such as, for example, any of a camera system, a LiDAR system, a radio detection and ranging (RADAR) system, an ANC system, a GPS, a navigation system, a telematics system (e.g., an OnStar® device), an infotainment system, a window system, an ignition system, a seat weight detection system, a seat belt detection system, and the like, any other suitable vehicle system(s) and/or device(s), or a combination thereof. Accordingly, in some examples, the vehicle 102 of FIG. 1A is a connected vehicle (sometimes referred to as a connected car).

The example controller 104 of FIG. 1A can be implemented, for example, using one or more microcontrollers, one or more ECUs, and the like, any other suitable control circuitry, or a combination thereof. In some examples, the controller 104 is in an in-vehicle controller that is fixedly coupled to and/or supported by the vehicle 102, such that the controller 104 is carried by the vehicle 102 while the vehicle 102 is moving. In FIG. 1A, the controller 104 is configured to communicate with any of the window actuator(s) 106, the sensor(s) 108, the HVAC system 112, and/or the other vehicle system(s) 114, for example, via one or more signal or transmission wires, the CAN bus, radio frequency, etc.

To facilitate providing automatic functions of the vehicle 102, the controller 104 is provided with at least a first processor 116 that includes and/or executes an example smart window application 118 (e.g., installed on the first processor 116). In FIG. 1A, the smart window application 118, which is sometimes referred to more generally as an application, exchanges data and/or communicates with an example alert dispatcher 120, as represented by first example communication link(s) 122. In some examples, the smart window application 118 advantageously utilizes at least one vehicle electronic component having communication capabilities such as, for example, a network access device (NAD) and/or a data communication module (DCM) of the vehicle 102, which enables the smart window application 118 to access one or more external networks (e.g., wireless and/or web-based communication networks) 124. In this manner, the smart window application 118 can direct the alert dispatcher 120 (e.g., to dispatch one or more alerts to the primary user device 110) and/or obtain information or data of interest (e.g., local weather information, local crime information, etc.) from one or more resources 126.

The resource(s) 126 of FIG. 1A include, for example, one or more databases, one or more web-based applications, big data sources, etc. that is/are external to the vehicle 102 and accessible to the smart window application 118 via the network(s) 124. In some examples, the resource(s) 126 include at least one database associated with a weather service provider. In such examples, the resource(s) 126 may provide the smart window application 118 with weather information for a location in which the vehicle 102 is parked such as, for example, weather forecasting, one or more weather alerts (e.g., real-time rain or storm alerts), and the like, and/or any other appropriate information. Such weather information or data provided by the resource(s) 126 is associated with the vehicle 102 and/or corresponds to the environment associated with the vehicle 102.

Each of the sensor(s) 108 of FIG. 1A is configured to generate sensor data (e.g., raw and/or pre-processed sensor data), which enables the smart window application 118 to determine when and/or how to take action in connection with alerting the user of the primary user device 110 and/or cooling the vehicle cabin. The sensor(s) 108 include, but are not limited to, one or more temperature sensors, one or more GPS locators, one or more cameras, one or more LiDAR sensors, one or more RADAR sensors, one or more ignition key sensors, one or more seat weight sensors, one or more seat belt sensors, one or more microphones or noise level sensors, and the like, any other suitable sensor(s) or sensing device(s) capable of generating sensor data, or a combination thereof. In some examples, at least some of the sensor(s) 108 are part of the vehicle system(s) 112, 114, and/or at least some of the sensor(s) 108 are separate components installed on the vehicle 102. In particular, the smart window application 118 analyzes and/or processes at least some or all of the sensor data (and/or data provided by the vehicle system(s) 112, 114) to detect a certain condition or status of the vehicle 102 indicating that the user likely requires assistance in cooling the cabin of the vehicle 102 and/or providing aid to an unattended occupant (e.g., one of a child, a pet, etc.) in the vehicle 102. Further, in some examples, the smart window application 118 advantageously utilizes data obtained from the resource(s) 126 to facilitate determining the status of the vehicle 102, such as the weather information and/or crime information for a detected location of the parked vehicle 102.

In some examples, the sensor(s) 108 enable the smart window application 118 to detect one or more observable parameters of the vehicle 102 such as, for example, any of a cabin temperature, an ignition state, a seat weight, a seat belt state, a cabin noise level, and the like. In other examples, the sensor(s) 108 enable the smart window application 118 to detect a current location of vehicle 102 and/or a relative orientation of the vehicle 102. Further, in other examples, the senor(s) 108 enable the smart window application 118 to detect one or more observable parameters of objects external to and near the vehicle 102 such as, for example, any of a position of a detected object relative to the vehicle 102, a distance between the detected object and the vehicle 102, a velocity of the detected object, one or more dimensions (e.g., a height, a length, a width, and/or a size) of the detected object, and the like.

Upon detecting the status of the vehicle 102, the smart window application 118 of FIG. 1A may generate one or more user alerts for the primary user device 110 and provide the user alert(s) to the primary user device 110. In some examples, the smart window application 118 generates a first user alert for the primary user device 110 indicative of a relatively hot vehicle cabin and transmits, via the first communication link(s) 122, the first user alert to the alert dispatcher 120 for dispatching. Additionally or alternatively, the smart window application 118 generates a second alert for the primary user device 110 indicative of the unattended occupant in the vehicle 102 and transmits, via the first communication link(s) 122, the second alert to the alert dispatcher 120 for dispatching.

The smart window application 118 may encode and/or embed certain information in such an alert, which appropriately notifies a person using the primary user device 110 with respect to the detected vehicle status and/or allows the person to respond to the alert (e.g., by interacting with the primary user device 110). For example, the alert may be provided with an interactive report or notification to facilitate decisions and/or selections made by the person (e.g., see FIG. 5 and/or FIG. 6). In some examples, the interactive notification includes, for example, any of the detected cabin temperature, the current location of the vehicle 102, current weather for the location, predicted weather for the location, detected objects (e.g., animals or critters, people, etc.) external to and near the vehicle, etc. Additionally, the interactive notification includes response options that the person can select upon receiving the alert, such as permitting the smart window application 118 to: (a) open the window(s), (b) activate the HVAC system 112, (c) turn on the vehicle 102, and/or (d) contact emergency services (e.g., if the unattended occupant is detected). More generally, alerts and/or notifications disclosed herein include information for a user of the primary user device 110 that may be necessary or required to enable the smart window application 118 to carry out or execute temperature control strategies disclosed herein.

The primary user device 110 of FIG. 1A can be used by and/or belong to a person (i.e., the user of the primary user device 110) who is not occupying the vehicle 102 while the vehicle 102 is stationary (e.g., parked and/or off), such as an owner of the vehicle 102 or a person who typically drives the vehicle 102. In some examples, the primary user device 110 includes a mobile device such as any of a smartphone, a tablet, a smart key fob, and/or, more generally, an electronic device having wireless and/or web-based communication capability (e.g., via satellite networks, cellular networks, other communication networks that may have access to the Internet, Bluetooth connectivity, and the like). The primary user device 110 of FIG. 1A may include a second processor 128. In FIG. 1A, the second processor 128 exchanges data and/or communicates with the alert dispatcher 120, as represented by second example communication link(s) 130. In particular, the user of the primary user device 110 can interact (e.g., view data and/or enter data) with the alert dispatcher 120 and/or the smart window application 118, for example, via one or more user interfaces (e.g., human machine interfaces (HMIs) and/or graphical user interfaces (GUIs)) such as a GUI 132 of the second processor 128.

In some examples, the alert dispatcher 120 enables the user of the primary user device 110 to receive a user alert generated by the smart window application 118 and/or view data associated with the user alert. For example, the alert dispatcher 120 can transmit, via the second communication link(s) 130, the first or second user alert to the primary user device 110, and the primary user device 110, upon receiving the alert, is configured to notify the user of the alert. To notify the user of an alert generated by the smart window application 118, the primary user device 110 can, for example, display a certain message on a screen of the primary user device 110 and/or generate certain sound(s) via an audio transducer or speaker of the primary user device 110 based on the data encoded in the alert.

Further, in some examples, the alert dispatcher 120 also enables the user of the primary user device 110 to respond to the alert, for example, by providing one or more appropriate inputs to the primary user device 110. For example, the user can provide or input a confirmation to the primary user device 110 after viewing a user alert presented via the primary user device 110. Then, the alert dispatcher 120 receives the confirmation from the primary user device 110 or the second processor 128 thereof and provides the confirmation to the smart window application 118 to initiate the temperature control strategies disclosed herein. In such examples, the confirmation permits the smart window application 118 to control the window actuator(s) 106 and, in some examples, one or more components (e.g., a blower and/or a compressor) of the HVAC system 112. Additionally, the second processor 128 of FIG. 1A can be provided with a first example database 134 that can store, for example, the alert(s) generated by the smart window application 118 and/or data input or provided by the user of the primary user device 110. Further, the first database 134 can store certain data associated with the user of the primary user device 110 that can be utilized to determine or predict when the user will use the vehicle 102, as discussed further below.

In some examples, the smart window application 118 of FIG. 1A is provided with one or more user configurable preferences or settings, such as seeking a confirmation from the user of the primary user device 110 prior to opening the window(s) of the vehicle 102. In particular, the user can interact, via the GUI 132, with the smart window application 118 to configure the preference(s) or setting(s) and/or certain criteria on which the smart window application 118 bases decisions. In such examples, the user can, for example, select or set one or more threshold temperatures associated with triggering the smart window application 118, designate certain areas (e.g., relatively low crime areas) in which the smart window application 118 is permitted to open the vehicle window(s), select or set a desired initial window position to which the smart window application 118 moves the vehicle window(s), toggle automatic alerts provided by the smart window application 118, and the like, or a combination thereof. Additionally or alternatively, in examples where the smart window application 118 monitors for an unattended vehicle occupant, the user can configure the smart window application 118 to, upon detecting the unattended vehicle occupant, automatically turn on the vehicle 102 and/or activate the component(s) of the HVAC system 112 to rapidly cool the vehicle 102.

The smart window application 118 of FIG. 1A can be configured to alert the user of the primary user device 110 at a certain time before the user arrives at the vehicle 102 (e.g., for commuting to and/or from work), which can provide the smart window application 118 with sufficient time to cool the vehicle cabin. In some examples, the smart window application 118 may analyze habits and/or patterns of the user to determine when the user typically drives the vehicle 102. Further, in some examples, the smart window application 118 may analyze and/or monitor positional data (e.g., real-time data) collected by the primary user device 110 (e.g., generated via a GPS locator in the primary user device 110) with respect to a location of the user to determine when the user is heading toward the vehicle 102. Further still, in some examples, the smart window application 118 communicates with one or more applications installed on the second processor 128, such as a calendar or planner application that provides upcoming appointments, activities, and/or driving events of the user to the smart window application 118, a tracking application that tracks the habits and/or the patterns of the user and provides related data to the smart window application 118, and the like. Accordingly, in such examples, the smart window application 118 can receive at least some data associated with the user from the primary user device 110 and/or the first database 134 and process the data to determine when the user is driving and/or arriving at the vehicle 102.

In some examples, the system 100 also includes a cloud computing platform 138 having a server 140 (e.g., an Internet server) that hosts the alert dispatcher 120. In the example of FIG. 1A, the alert dispatcher 120 exchanges data and/or communicates with the vehicle controller 104 and the primary user device 110 via the external network(s) 124, as represented by the first and second communication links 122, 130. Additionally, in some examples, the alert dispatcher 120 can similarly exchange data and/or communicate with one or more different vehicle controllers and/or one or more different user devices via the external network(s) 124. The external network(s) 124 of FIG. 1A can include, for example, one or more radio access networks (RANs), one or more cellular networks, one or more satellite networks, one or more local area networks (LANs), one or more wide area networks (WANs), the Internet, and the like, any other suitable network(s) that may use the Internet, or a combination thereof.

As previously described, the alert dispatcher 120 of FIG. 1A receives the alert(s) from the smart window application 118 and dispatches or transmits the alert(s) to the primary user device 110. Additionally, the alert dispatcher 120 can receive data from the primary user device 110 and transmit the data to the smart window application 118. In some examples, in addition or alternatively to communicating with the alert dispatcher 120, the smart window application 118 of FIG. 1A can be configured to directly exchange data and/or communicate with the primary user device 110, as represented by a third example communication link 142. In such examples, the smart window application 118 may advantageously utilize one or more antennas coupled to the vehicle 102 to enable wireless data transmission such as, for example, any of low frequency (LF) antennas, Bluetooth antennas, and the like.

While an example manner of implementing the system 100 is illustrated in FIG. 1A, one or more of the elements, processes, and/or devices illustrated in FIG. 1A may be combined, divided, rearranged, omitted, eliminated, and/or implemented in any other way. Further, the example system 100 of FIG. 1A may include one or more elements, processes, and/or devices in addition or alternatively to those illustrated in FIG. 1A, and/or may include more than one of any of the illustrated elements, processes, and devices. In the example of FIG. 1A, the smart window application 118 is depicted as an in-vehicle application that is hosted by the first processor 116, while the alert dispatcher 120 is depicted as a web-based application that is hosted by the server 140. However, any other system architecture may be used. In some examples, some or all of the operations or functions of the smart window application 118 may be resident in the alert dispatcher 120 (e.g., via the server 140).

Figure 1B:
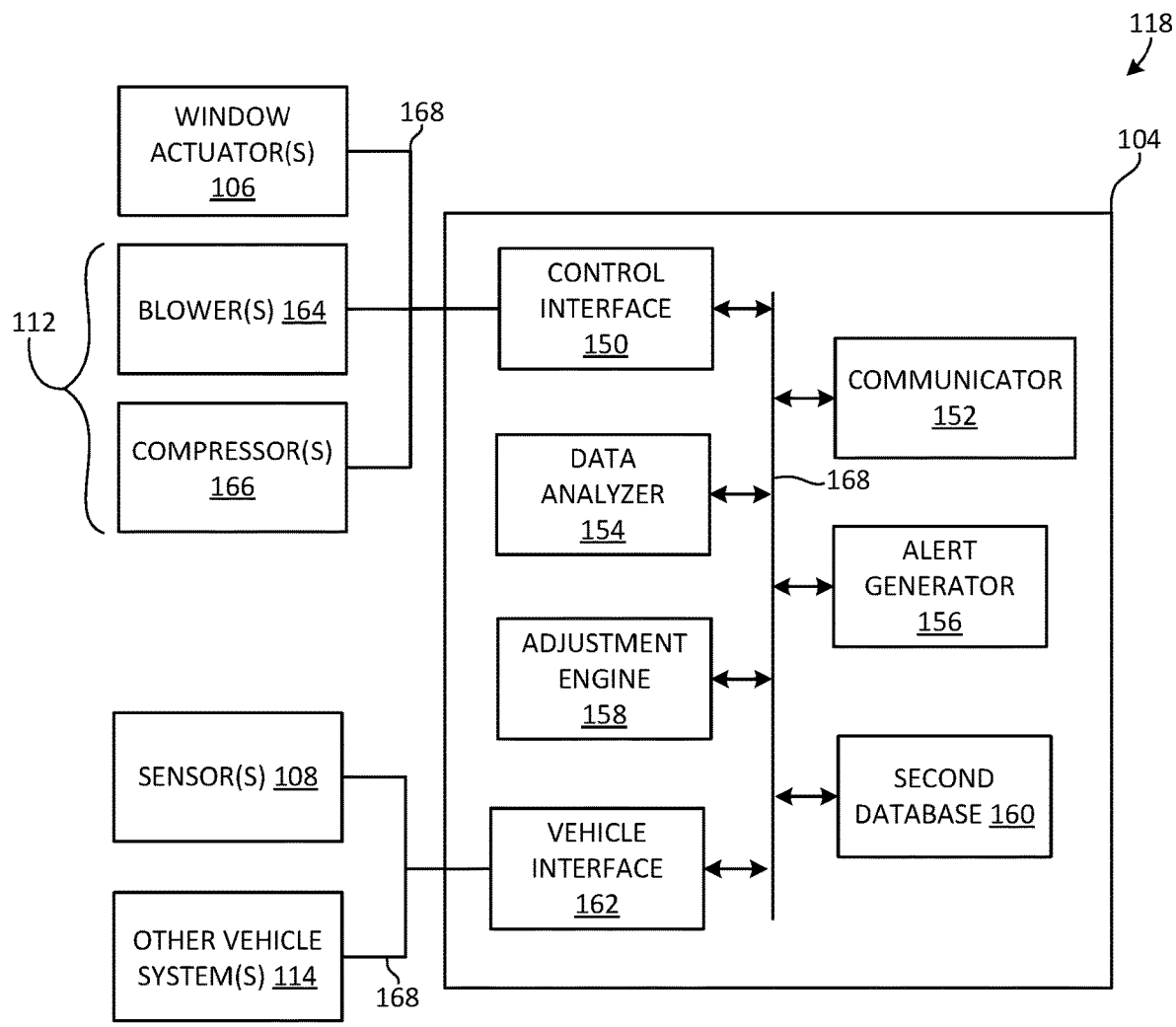
FIG. 1B illustrates a block diagram of an example smart window application in accordance with the teachings of this disclosure.

FIG. 1B illustrates a block diagram of the smart window application 118 of the example system 100 shown in FIG. 1A. The smart window application 118 of FIG. 1B can be implemented, for example, by the controller 104 of FIG. 1A. Additionally or alternatively, the smart window application 118 or at least part thereof could be implemented by the cloud computing platform 138 of FIG. 1A and/or the primary user device 110 of FIG. 1A.

According to the illustrated example of FIG. 1B, the smart window application 118 includes a control interface 150, a communicator 152, a data analyzer 154, an alert generator 156, an adjustment engine 158, a second database 160, and a vehicle interface 162. The smart window application 118 of FIG. 1B is communicatively coupled to the window actuator(s) 106, the sensor(s) 108, the other vehicle system(s) 114, one or more example blowers 164, and one or more example compressors 166 via one or more example communication links 168 such as, for example, one or more signal or transmission wires, a bus, radio frequency, etc. In particular, the control interface 150 of FIG. 1A is configured to provide one or more advantageous control signals or commands and/or electrical power to the window actuator(s) 106 to control one or more windows of the vehicle 102 while the vehicle 102 is stationary (e.g., parked and/or off). Additionally, to facilitate rapidly changing a temperature in the cabin of the vehicle 102, the control interface 150 can provide one or more advantageous control signals or commands and/or electrical power to any of the blower(s) 164, the compressor(s) 166, and/or, more generally, the HVAC system 112.

In the example of FIG. 1B, the control interface 150 facilitates interactions and/or communications between the smart window application 118 and the window system of the vehicle 102 and/or the HVAC system 112. The control interface 150 of FIG. 1B is communicatively coupled, via the link(s) 168, to the window actuator(s) 106 to transmit the control signal(s) or commands and/or electrical power to the window actuator(s) 106. For example, the control interface 150 can direct a first one of the window actuator(s) 106 to generate a certain output (e.g., torque and/or force) that causes a first vehicle window (e.g., a front left window of the vehicle 102 such as the first vehicle window 202 shown in FIG. 2) to open, close, and/or otherwise change position. Further, in another example, the control interface 150 can direct a second one of the window actuator(s) 106 to generate a certain output that causes a second vehicle window (e.g., a rear left window of the vehicle 102 such as the second vehicle window 204 shown in FIG. 2) to open, close, and/or otherwise change position.

Additionally, the control interface 150 of FIG. 1B can be communicatively coupled, via the link(s) 168, to the blower(s) 164 and/or the compressor(s) 166 to transmit the control signal(s) or command(s) and/or electrical power thereto. In some examples, the control interface 150 activates the blower(s) 164 and/or directs the blower(s) 164 to increase airflow through the cabin of the vehicle 102. Further, in some examples, the control interface 150 activates the compressor(s) 166 and/or directs the compressor(s) 166 to cool air output by the blower(s) 164.

To determine whether to alert the user of the primary user device 110 and/or cool the cabin of the vehicle 102, the data analyzer 154 of FIG. 1B processes data received or obtained from the communicator 152, the vehicle interface 162, and/or the second database 160. In particular, the data analyzer 154 can detect, based on the obtained data, a certain initial condition or status of the vehicle 102, for example, indicating that the user likely requires assistance in cooling the cabin of the vehicle 102 and/or aiding an unattended occupant in the vehicle 102, which is sometimes referred to as an initial status of interest. If the initial status of interest is detected by the data analyzer 154, the data analyzer 154 enables the alert generator 156 and the communicator 152 to notify and/or alert (e.g., via the alert dispatcher 120) the user of the primary user device 110 with respect to the status. Additionally or alternatively, after detecting the initial status of interest, the data analyzer 154 may enable (a) the adjustment engine 158 to provide one or more initial adjustments for the window actuator(s) 106 associated with opening the vehicle window(s) and (b) the control interface 150 to carry out or execute the adjustment(s). In any case, the data analyzer 154 may transmit, via the link(s) 168, detected statuses of the vehicle 102 and/or related data to the second database 160.

The initial status of interest is based on certain conditions or criteria (e.g., stored in the second database 160) associated with the vehicle 102, which can include, for example, any of cabin temperature criteria, vehicle location criteria, weather criteria, environment or surroundings criteria, vehicle engine or ignition criteria, seat belt criteria, seat weight criteria, cabin noise level criteria, and the like, any other suitable criteria that may be associated with active cooling or venting, or a combination thereof. Such criteria and checks thereof are discussed in greater detail below in connection with FIGS. 8A, 8B, and 9. In particular, the data analyzer 154 performs one or more comparisons between data obtained by the smart window application 118 and at least some or all of the above conditions or criteria (a)-(k), thereby determining whether to assist the user of the primary user device 110. For example, the data analyzer 154 may compare (e.g., continuously and/or repeatedly) a detected cabin temperature to a certain threshold temperature associated with opening the vehicle window(s) and/or alerting the user of the primary user device 110. In another example, the data analyzer 154 may compare the detected cabin temperature to a certain target temperature associated with closing the vehicle window(s) when cabin venting is complete. Each of the threshold temperature and the target temperature is a value representing a temperature of a vehicle cabin, where the threshold temperature is greater than the target temperature. In such examples, the threshold temperature and/or the target temperature may be stored in the second database 160 and, in some examples, can be set by the user of the primary user device 110.

Additionally, the data analyzer 154 of FIG. 1A can provide for mapping of an environment (e.g., see the environment 200 of FIG. 2) associated with the vehicle 102. As such, at least some of the data obtained by the application 118 (e.g., via communicator 152 and/or the vehicle interface 162) includes data corresponding to the environment such as, for example, any of camera data, LiDAR data, RADAR data, weather data or information, and the like, or a combination thereof. In such examples, the data analyzer 154 may monitor external object(s) near the vehicle 102 and/or weather conditions associated with the vehicle 102 that could pose risks to the vehicle 102. In such examples, while the cabin of the vehicle 102 is venting, the data analyzer 154 receives and/or processes the obtained data to detect certain events (e.g., real-time events) and/or changes in the environment, wherein one or more of the vehicle window(s) should be adjusted (e.g., closed), as discussed further below in connection with FIGS. 2 and 3. If a detection or prediction is made, the data analyzer 154 enables (a) the adjustment engine 158 to provide one or more additional or real-time adjustments for the window actuator(s) 106 associated with moving the vehicle window(s) and (b) the control interface 150 to carry out or execute the adjustment(s) in substantially real-time.

In the example of FIG. 1B, the adjustment engine 158 performs one or more calculations associated with controlling the window actuator(s) 106 and/or output generated by the window actuator(s) 106. As such, the adjustment engine 158 can transmit, via the link(s) 168, computed data to the second database 160 and/or the control interface 150. In particular, the adjustment engine 158 determines one or more example window adjustments (e.g., initial window adjustments and/or real-time adjustments) for the actuator(s) 106 associated with changing a position of at least one vehicle window and/or moving the vehicle window. For example, a window adjustment can include opening (e.g., partially or fully rolling down) at least one window of the vehicle 102 while maintaining positions of the other windows of the vehicle 102. Further, another window adjustment can include opening two or more (e.g., all) of the windows of the vehicle 102. Conversely, another window adjustment can include closing (e.g., partially or fully rolling up) at least one window of the vehicle 102 while maintaining positions of the other windows of the vehicle 102, and/or closing two or more (e.g., all) of the windows of the vehicle 102. Additionally, while the cabin of the vehicle 102 is venting, the adjustment engine 158 of FIG. 1B can determine which window(s) of the vehicle 102 to adjust and/or how to adjust the window(s) based on detections made by the data analyzer 154. In any case, after determining the window adjustment(s), the adjustment engine 158 transmits, via the link(s) 168, the adjustment(s) and/or related data to the control interface 150 to control the window actuator(s) 106 accordingly.

In the example of FIG. 1B, the communicator 152 facilitates communications and/or interactions between the smart window application 118 and one or more electronic devices and/or systems external to the vehicle 102. The communicator 152 of FIG. 1B receives incoming data or information (e.g., via wireless and/or web-based communication methods or techniques) to encode, analyze, filter, and/or pre-process the data for the data analyzer 154 and/or the second database 160. The communicator 152 can store such data in the second database 160. Further, the communicator 152 can encode, analyze, filter, and/or pre-process outgoing data or information for the alert dispatcher 120 and/or the primary user device 110. Such outgoing data generated and/or provided by the communicator 152 may include at least some of the data/information stored in the second database 160 to facilitate decisions and/or selections made by the user of the primary user device 110. In some examples, the communicator 152 transmits one or more alerts (e.g., generated by the alert generator 156) to the primary user device 110, for example, directly or across the network(s) 124 via the alert dispatcher 120. As such, the communicator 152 of FIG. 1B is also communicatively coupled to the alert generator 156 via the communication link(s) 168 to receive the alert(s) from the alert generator 156.

In some examples, communicator 152 of FIG. 1B is communicatively coupled to the alert dispatcher 120 via the external network(s) 124 and/or the first communication link(s) 122 to provide (e.g., continuously and/or repeatedly) data to the alert dispatcher 120 and/or receive (e.g., continuously and/or repeatedly) data form the alert dispatcher 120. In such examples, the communicator 152 of FIG. 1B includes, for example, an NAD or a DCM, which may be implemented using an ECU of a vehicle telematics device. Accordingly, the communicator 152, when active or enabled, can provide the smart window application 118 with access to the external network(s) 124. Thus, the communicator 152 can enable effective communications between the smart window application 118 and the alert dispatcher 120 and/or the server 140 hosting the alert dispatcher 120.

Additionally or alternatively, in some examples, the communicator 152 of FIG. 1B is communicatively coupled to the primary user device 110 via the third communication link(s) 142 to provide (e.g., continuously and/or repeatedly) data to the primary user device 110 and/or receive (e.g., continuously and/or repeatedly) data from the primary user device 110. In such examples, the communicator 152 may be connected to and/or include one or more antennas such as, for example, any of LF antennas, Bluetooth antennas, and the like. Accordingly, the communicator 152 can enable effective wireless and/or short-range communications between the smart window application 118 and the primary user device 110 (and/or one or more other user or electronic devices). In such examples, when the primary user device 110 is within relatively close proximity to the vehicle 102, the communicator 152 of FIG. 1B is configured to automatically connect or link the smart window application 118 to the primary user device 110. Thus, in some examples, the smart window application 118 and the primary user device 110 can communicate with each other via the communicator 152, independent of the alert dispatcher 120, the server 140, and the external network(s) 124.

In some examples, the communicator 152 communicates with and/or accesses the resource(s) 126 via the external network(s) 124 to receive or obtain certain weather information from the resource(s) 126 such as, for example, any of current weather for a location in which vehicle 102 parked, predicted weather for the location, and the like. In such examples, the smart window application 118 determines one or more wind parameters based on the obtained weather information such as, for example, any of wind direction (e.g., one of North, South, East, West, or a combination thereof), wind speed, and the like. In other examples, the communicator 152 receives certain crime information for the location from the resource(s) 126, such as car theft rates, a number of vehicles recently reported stolen, and the like. Such data provided by the resource(s) 126 is associated with the vehicle 102 and corresponds to the environment. Additionally, the communicator 152 can obtain such data while the vehicle 102 is stationary and/or the window(s) is/are open.

In the example of FIG. 1B, the vehicle interface 162 facilitates interactions and/or communications between the smart window application 118 and one or more electronic devices and/or systems associated with the vehicle 102. The vehicle interface 162 can include, for example, at least one CAN transceiver and/or at least one CAN controller capable of electronically communicating via the bus of the vehicle 102. In particular, the vehicle interface 162 is communicatively coupled, via the link(s) 168, to the sensor(s) 108 to receive (e.g., continuously and/or repeatedly) sensor data from the sensor(s) 108. Additionally or alternatively, the vehicle interface 162 is communicatively coupled, via the link(s) 168, to the other vehicle system(s) 114 to receive (e.g., continuously and/or repeatedly) data from the other vehicle system(s) 114 and/or provide data to the other vehicle system(s) 114.

The sensor(s) 108 of FIG. 1B can provide certain sensor data to the vehicle interface 162. For example, the sensor(s) 108 can provide any of cabin temperature data, vehicle location or positional data (e.g., coordinates), the camera data, the LiDAR data, the RADAR data, vehicle engine or ignition data, seat weight data, cabin noise or sound level data, and the like to the vehicle interface 162. Such data provided by the sensor(s) 108 is associated with the vehicle 102 and may correspond to the environment. Additionally, the vehicle interface 162 can obtain such data while the vehicle 102 is parked and/or the window(s) is/are open. After receiving such sensor data, the vehicle interface 162 may transmit, via the link(s) 168, the sensor data and/or related detection(s) to any of the data analyzer 154, the adjustment engine 158, and/or the second database 160.

In some examples, the sensor(s) 108 provide to the vehicle interface 162 a detected cabin temperature and/or sensor data indicative of a temperature in the cabin the vehicle 102. In other examples, the sensor(s) 108 provide to the vehicle interface 162 a detected vehicle location and/or sensor data indicative of a location of the vehicle 102. In other examples, the sensor(s) 108 provide to the vehicle interface 162 sensor data indicative of one or more objects in an environment external to and/or surrounding the vehicle 102 such as, for example, the object of interest 212 discussed below. In other examples, the sensor(s) 108 provide to the vehicle interface 162 a detected ignition state and/or sensor data indicative of whether the vehicle 102 is on and/or keys are in an ignition of the vehicle 102. In other examples, the sensor(s) 108 provide to the vehicle interface 162 a detected seat weight (e.g., a rear seat weight) and/or sensor data indicative of a weight associated with a seat (e.g., a rear seat) in the cabin of the vehicle 102. In other examples, the sensor(s) 108 provide to the vehicle interface 162 a detected seat belt status (e.g., a rear seat belt status) and/or sensor data indicative of whether a seat belt (e.g., rear seat belt) is buckled. In other examples, the sensor(s) 108 provide to the vehicle interface 162 a detected cabin noise level and/or sensor data indicative of a sound or noise level in the cabin. Thus, in some examples, the smart window application 118 is configured to detect and/or determine, via the sensor(s) 108, any of (a) the temperature in the cabin of the vehicle 102, (b) the location of the vehicle 102, (c) the presence of one or more objects of interest external to and/or near the vehicle 102, (d) an ignition state of the vehicle 102, (e) the weight associated with the seat, (f) a status of the seat belt, (g) the sound or noise level in the cabin, (h) and the like, (j) or a combination thereof.

In the example of FIG. 1B, the alert generator 156 is communicatively coupled, via the communication link(s) 168, to the second database 160 and/or the data analyzer 154 to receive data therefrom. In particular, the alert generator 156 of FIG. 1B is configured to generate one or more example user alerts (e.g., the first user alert and/or the second user alert previously described), for example, in response to the data analyzer 154 detecting the initial status of interest. Further, the alert generator 156 of FIG. 1B is communicatively coupled to the communicator 152 via the communication link(s) 168. After generating a user alert, the alert generator 156 can store the user alert in the second database 160 and/or provide the user alert directly to the communicator 152 so that the user alert can be transmitted to the primary user device 110.

The alert generator 156 can encode and/or embed certain data in a user alert, which can be accessed by the user of the primary user device 110. In some examples, the alert generator 156 generates and/or provides interactive reports or notifications, dynamic selection fields, and/or natural language phrases that may be displayed via the GUI 132. In some examples, the alert generator 156 organizes or formats the notifications based on, for example, settings information provided by the user. In other examples, questions generated (e.g., via text or audio) by the alert generator 156 may include, for example, questions relating to cabin cooling actions that can be taken for the vehicle 102.

In the example of FIG. 1B, the second database 160 stores (e.g., temporarily and/or permanently) data and/or provides access to at least some or all of the data in the second database 160. The second database 160 of FIG. 1B is communicatively coupled, via the link(s) 168, to the control interface 150, the communicator 152, the data analyzer 154, the alert generator 156, the adjustment engine 158, and the vehicle interface 162. In some examples, any one or more (e.g., all) of the control interface 150, the communicator 152, the data analyzer 154, the alert generator 156, the adjustment engine 158, and/or the vehicle interface 162 transmit (e.g., repeatedly and/or continuously) data to the second database 160. Conversely, in some examples, the second database 160 transmits (e.g., repeatedly or continuously) data to any one or more (e.g., all) of the control interface 150, the communicator 152, the data analyzer 154, the alert generator 156, the adjustment engine 158, and/or the vehicle interface 162.

In some examples, the second database 160 may store one or more thresholds. As previously described, the second database 160 may store the threshold temperature and/or the target temperature that are associated with opening and closing the window(s) of the vehicle 102. Additionally, the second database 160 can store certain types of weather that may not pose substantial risks to a vehicle interior, such as hot, sunny, cloudy, and the like, or a combination thereof, which better enables the data analyzer 154 to make a determination with respect opening a vehicle window. Further, the second database 160 can store one or more user designated areas or locations in which the window(s) of the vehicle 102 can be opened by the application 118.

While an example manner of implementing the smart window application 118 is illustrated in FIG. 1B, one or more of the elements, processes, and/or devices illustrated in FIG. 1B may be combined, divided, rearranged, omitted, eliminated, and/or implemented in any other way. Further, the example smart window application 118 of FIG. 1B may include one or more elements, processes, and/or devices in addition or alternatively to those illustrated in FIG. 1B, and/or may include more than one of any of the illustrated elements, processes, and devices.

Additionally, one or more of the example control interface 150, the example communicator 152, the example data analyzer 154, the example alert generator 156, the example adjustment engine 158, the example second database 160, the example vehicle interface 162, and/or, more generally, the example smart window application 118 of FIG. 1B may be implemented by hardware, software, firmware and/or any combination thereof. For example, one or more (e.g., all) of the control interface 150, the communicator 152, the data analyzer 154, the alert generator 156, the adjustment engine 158, the second database 160, the vehicle interface 162, and/or, more generally, the smart window application 118 could be implemented by one or more circuits (e.g., an analog or digital circuit, a logic circuit, a programmable processor, etc.). Further, in some examples, at least one of the control interface 150, the communicator 152, the data analyzer 154, the alert generator 156, the adjustment engine 158, the second database 160, the vehicle interface 162, and/or the smart window application 118 include(s) a tangible machine-readable storage device or storage disk (e.g., a memory storing the software and/or firmware).

Figure 2:
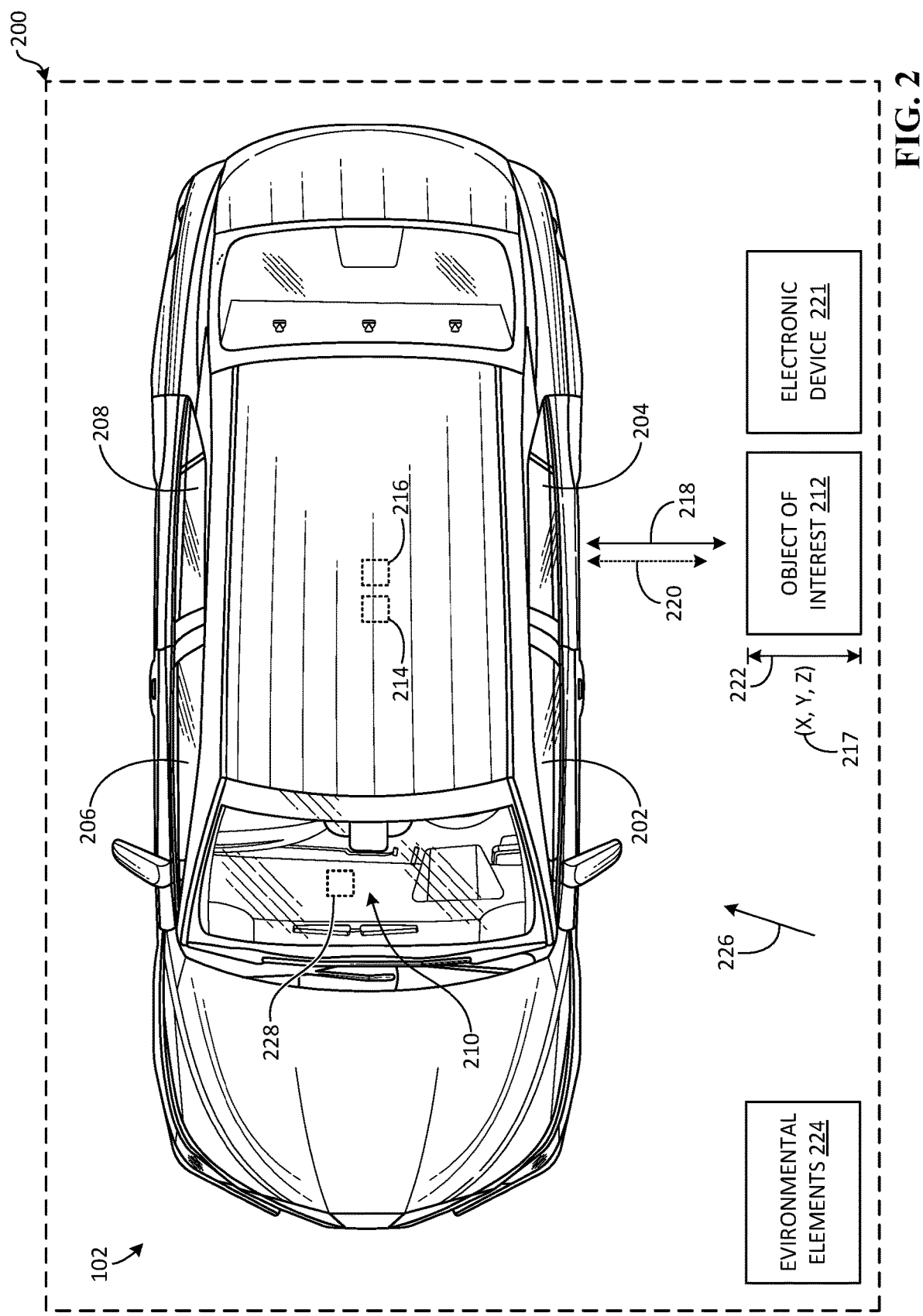
FIGS. 2 and 3 are detailed views of the example vehicle of FIG. 1A and show example environments associated with the vehicle.

FIG. 2 is top-view of the example vehicle of FIG. 1A and shows a first example environment 200 (e.g., mapped by the data analyzer 154) that is external to and/or surrounding the vehicle 102. The first environment 200 is substantially represented by the dotted/dashed lines of FIG. 2. In FIG. 2, the vehicle 102 is parked (i.e., stationary), and/or an engine of the vehicle 102 is off with no keys in the ignition. Further, the vehicle 102 of FIG. 2 has no occupants therein.

The vehicle 102 of FIG. 2 is provided with one or more windows (e.g., glass) that are movable and/or adjustable, four of which are shown in this example. For example, a first window (e.g., a front left window) 202 and a second window (e.g., a rear left window) 204 can be installed on a first side of the vehicle 102, while a third window (e.g., a front right window) 206 and a fourth window (e.g., a rear right window) 208 can be installed on a second side of the vehicle 102 opposite to the first side. Each of the vehicle windows 202, 204, 206, 208 shown in FIG. 2 is operatively coupled to the vehicle 102, for example, via a regulator assembly in a vehicle door that enables and/or guides window movement. In particular, each of the vehicle window(s) 202, 204, 206, 208 is movable and/or configured to move between different window positions such as, for example, a fully closed position, a fully open position, and/or a position between the fully closed and open positions. To enable window operation, each of the vehicle window(s) 202, 204, 206, 208 is connected to a respective one of the window actuator(s) 106 to receive the output therefrom. Generally speaking, output of a window actuator 106 causes a respective one of the vehicle window(s) 202, 204, 206, 208 to open, close, and/or change from a first window position to a second window position different from the first window position. In FIG. 2, one or more of the vehicle windows 202, 204, 206, 208 are open (e.g., partially or fully rolled down) to expose a cabin 210 of the vehicle 102 to the first environment 200, where ambient air is allowed to flow into the cabin 210 through the windows 202, 204, 206, 208 and/or cabin air is allowed to flow out of the cabin 210 through the windows 202, 204, 206, 208.

According to the illustrated example of FIG. 2, an object of interest 212 in the first environment 200 is approaching the vehicle 102, which can be detected by the aforementioned application 118. The object of interest 212 of FIG. 2 could be, for example, a critter or a person not authorized to use and/or enter the vehicle 102. In some examples, the application 118 detects the presence of the object of interest 212 via the sensor(s) 108 and/or the other vehicle system(s) 114. For example, the vehicle interface 162 can receive sensor data from one or more cameras 214 and/or one or more LiDAR sensors 216 positioned on part (e.g., a roof) of the vehicle 102, where the object of interest 212 is in a field of view (FOV) of at least one camera 214 and/or at least one LiDAR sensor 216. The camera(s) 214 and LiDAR sensor(s) 216 of FIG. 2 can be used to implement at least some of the sensor(s) 108 and/or the other vehicle system(s) 114. In such examples, the camera(s) 214 and/or the LiDAR sensor(s) 216 of FIG. 2 are configured to generate sensor data corresponding to the first environment 200 and/or indicative of the object of interest 212, such as image data, light scattering data, and the like, and/or any other suitable data that can enable the application 118 to detect the object of interest 212. In other examples, the camera(s) 214 and/or the LiDAR sensor(s) 216 detect the object of interest 212 and provide or communicate the detection to the application 118. In particular, the application 118 can advantageously utilize the camera(s) 214 and/or the LiDAR sensor(s) 216 to determine, for example, any of spatial coordinates 217 of the object of interest 212, a position of the object of interest 212 relative to the vehicle 102, a distance 218 between the object of interest 212 and the vehicle 102, a direction of travel of the object of interest 212, a speed and/or velocity of the object of interest 212, and the like.

The object of interest 212 of FIG. 2 can trigger the application 118, for example, if the object of interest 212 is within relatively close proximity to the vehicle 102. As shown in FIG. 2, the distance 218 between the object of interest 212 and the vehicle 102 is greater than a threshold distance 220. The threshold distance could be, for example, 15 feet (ft.), 10 ft., 5 ft., etc., and/or any other appropriate value. Further, the threshold distance 220 may be stored in the second database 160 and/or set to a desired value by the user of the primary user device 110. As previously described, the application 118 can calculate and/or determine the distance 218, for example, via the camera(s) 214 and/or the LiDAR sensor(s) 216. The distance 218 shown in FIG. 2 may be defined by at least one point corresponding to the object of interest 212 and at least one point corresponding to the vehicle 102. In such examples, if the application 118 determines that the distance 218 between the object of interest 212 and the vehicle 102 is less than the threshold distance 220, the application 118 directs the window actuator(s) 106 to close (e.g., partially or fully roll up) one or more (e.g., all) of the windows 202, 204, 206, 208, for example, until the distance 218 is greater than the threshold 220. As such, the application 118 may repeatedly and/or continuously determine the distance 218 and compare the distance 218 to the threshold distance 220. In this manner, the application 118 effectively prevents the object of interest 212 from entering the vehicle 102 or the cabin 210 through an open window. Additionally or alternatively, the application 118 may account for other observable parameters of the object of interest 212 that can be used to determine whether the object of interest 212 is approaching the vehicle 102, such as the direction of travel, the speed, and/or the velocity of the object of interest 212.

In some examples (e.g., where all of the windows 202, 204, 206, 208 are open), the application 118 may close some vehicle windows (e.g., the first window 202 and the second window 204) while leaving the other vehicle windows (e.g., the third window 206 and the fourth window 208) open, where the object of interest 212 is closer to the closed windows compared to the open windows. For example, in FIG. 2, the application 118 may determine that the object of interest 212 is near the first side of the vehicle 102 and/or closer to the first and second windows 202, 204 compared to the third and fourth windows 206, 208. Accordingly, when the object of interest 212 of FIG. 2 triggers the application 118, the first and second windows 202, 204 may be closed while the third and fourth windows 206, 208 may be left open. Additionally, the smart window application 118 can be configured to monitor the object of interest 212 via the camera(s) 214 and/or the LiDAR sensor(s) 216 and adjust the window(s) 202, 204, 206, 208 based on detected changes in the position of the object of interest 212. In such examples, if the object of interest 212 of FIG. 2 moves away from the first side of the vehicle 102 toward the second side of the vehicle 102, the smart window application 118 may close the third window 206 and the fourth window 208.

In some examples, the application 118 distinguishes between a person and an animal or critter when detecting such an object of interest. If the object of interest 212 is likely an animal or critter, the application 118 may calculate and/or determine one or more dimensions 222 of the object of interest 212 via the camera(s) 214 and/or the LiDAR sensor(s) 216, such as any of a height, a width, a length, a size, and the like. In such examples, the application 118 is configured to advantageously adjust one or more of the windows 202, 204, 206, 208 based on the dimension(s) 222. For example, the application 118 may partially roll up an open window 202, 204, 206, 208 by a certain degree, thereby providing a window opening having a size that is substantially smaller than the size of the object of interest 212, which allows the vehicle cabin 210 to vent and/or cool while still preventing the object of interest 212 from entering the cabin 210 through the window opening.

On the other hand, if the object of interest 212 is likely a person, the application 118 is configured to check whether the object of interest 212 is an authorized person or user of the vehicle 102 prior to adjusting or closing any of the windows 202, 204, 206, 208. In some examples, the communicator 152 attempts to wirelessly communicate with an electronic device 221 proximate to the object of interest 212, which could be, for example, a key fob (e.g., a smart key fob) and/or a user device (e.g., the primary user device 110) that can be used to identify the person. If the communication attempt is successful and/or it is verified that the object of interest 212 is an authorized user of the vehicle 102, the application 118 may leave the windows 202, 204, 206, 208 open, depending on the user configurable preference(s) or setting(s) of the application 118. However, if the communication attempt is unsuccessful and/or it is determined that the object of interest 212 is not an authorized person or user of the vehicle 102, the application 118 may, for example, close one or more (e.g., all) of the windows 202, 204, 206, 208. In some examples, to allow the cabin 210 to vent while preventing vehicle entry by the unauthorized user, the application 118 may move one or more of the windows 202, 204, 206, 208 to a certain or target window position (e.g., stored in the second database 160) associated with providing a relatively small window opening that is too small for a person to fit their hand(s), wrist(s), and/or finger(s) through.

Additionally or alternatively, certain weather and/or changes therein can trigger the application 118, where environmental elements (e.g., any of dust, dirt, sand, water, etc.) 224 harmful to the interior of the vehicle 102 are present and/or airborne in the first environment 200. As previously described, the application 118 can determine the location of the vehicle 102 (e.g., via communicating with an in-vehicle GPS) and obtain weather information from the resource(s) 126 for the location (i.e., obtain data associated with the vehicle 102 corresponding to the first environment 200). In particular, the application 118 can determine (e.g., continuously and/or repeatedly) the weather for the location of the vehicle 102 shown in FIG. 2 and/or monitor weather conditions associated therewith. In some examples, if it is determined that a certain weather event (e.g., a dust or sand storm, rain, and the like) is occurring or will occur imminently at the location of the vehicle 102, the application 118 may close one or more (e.g., all) of the window(s) 202, 204, 206, 208 of the vehicle 102 to prevent the external elements 224 from entering the vehicle cabin 210, for example, until the weather event is finished. That is, the application 118 can be configured to detect one or more changes in the weather for the location of the vehicle 102 based on the weather information and, in response, close the window(s) 202, 204, 206, 208.

Further, the application 118 may advantageously utilize one or more detected wind parameters for the location of the vehicle 102 in connection with adjusting the window(s) 202, 204, 206, 208, which can provide for improved and/or optimized venting characteristics. In some examples, the application 118 is configured to determine a wind direction (e.g., North, South, East, West, or a combination thereof) 226 of the wind in the first environment 200 based on the weather information received from the resource(s) 126. The application 118 can also determine an orientation of the vehicle 102 relative to the wind direction 226 via the sensor(s) 108. That is, the application 118 can determine a direction in which the vehicle 102 faces relative to the wind. In such examples, the application 118 is configured to adjust one or more of the windows 202, 204, 206, 208 based on the wind direction 226 and the orientation of the vehicle 102 to increase (e.g., maximize) airflow in the vehicle cabin 210, which enables the cabin 210 to cool more rapidly. Additionally or alternatively, if the weather event is occurring, the application 118 can be configured to adjust the window(s) 202, 204, 206 based on the wind direction 226 and the orientation to prevent the external elements 224 from entering the vehicle cabin 210 without substantially interfering with cabin venting. For example, if the wind is blowing the environmental elements 224 onto the first side of the vehicle 102 but not the second side, the application 118 fully rolls up only the first and second window(s) 202, 204 (i.e., vehicle windows corresponding to the first side of the vehicle 102), while leaving the third window 206 and the fourth window 208 at least partially open.

In FIG. 2, one or more temperature sensors 228 (represented by the dotted/dashed lines of FIG. 2) are operatively coupled to the vehicle 102, which correspond to and/or can be used to implement one or more of the sensor(s) 108 of FIGS. 1A and 1B. As such, the temperature sensor(s) 228 of FIG. 2 are communicatively coupled to the vehicle interface 162 to provide sensor data to the vehicle interface 162 indicative of a temperature in the vehicle cabin 210. The temperature sensor(s) 228 may be in fluid communication with the vehicle cabin 210, where air in the vehicle cabin 210 can flow across the temperature sensor(s) 228. In particular, the application 118 is configured to determine a temperature of the vehicle cabin 210 and/or monitor the temperature via the temperature sensor(s) 228.

Figure 3:
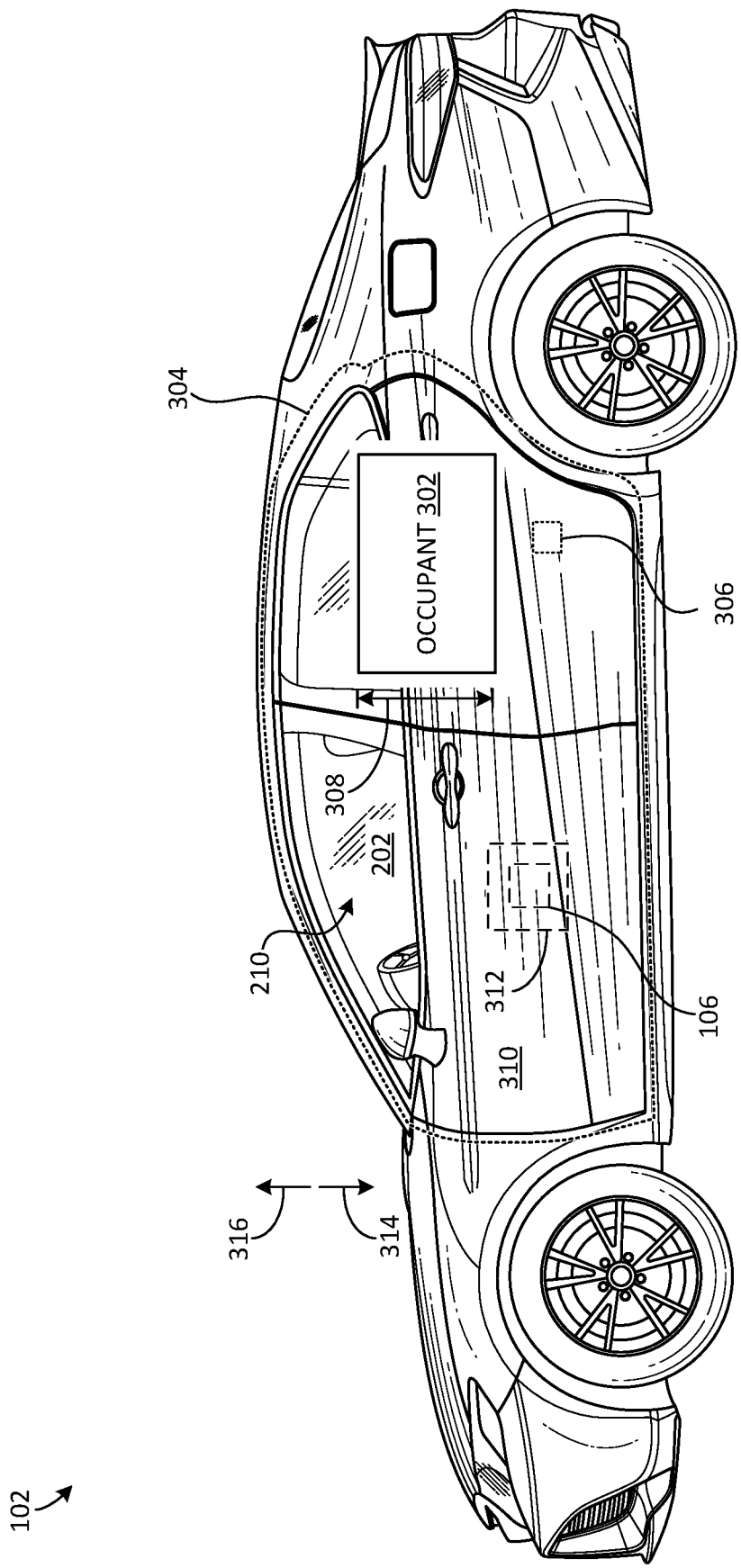

FIG. 3 is a side view of the example vehicle 102 of FIG. 1A. According to the illustrated example of FIG. 3, an occupant (e.g., any of a child, a pet, etc.) 302 is unattended in the vehicle cabin 210 while the vehicle 102 is parked and/or off. Additionally, in FIG. 3, unlike the illustrated example of FIG. 2, all of the windows 202, 204, 206, 208 of the vehicle 102 are fully closed or rolled up, which can pose risks to the occupant 302 if the temperature of cabin 210 increases.

The vehicle cabin 210 of FIG. 3 may define a second environment (represented by the dotted/dashed lines of FIG. 3) 304, different from the first environment 200, that is internal to the vehicle 102. In some examples, the application 118 detects the presence of the occupant 302 via the sensor(s) 108. For example, the vehicle interface 162 receives sensor data from one or more seat weight sensor(s) 306 coupled to a seat (e.g., a rear seat) on which the occupant 302 is positioned, which can indicate the presence of the vehicle occupant 302 to the application 118 (e.g., when a detected seat weight is greater than a certain threshold weight). The seat weight sensor(s) 306 of FIG. 3 correspond to and/or can be used to implement at least some of the sensor(s) 108 and/or the other vehicle system(s) 114 previously described. Further, in another example, the vehicle interface 162 receives sensor data from an in-vehicle camera system of the vehicle 102, which can also indicate the presence of the vehicle occupant 302 to the application 118. Further still, in another example, the vehicle interface 162 receives sensor data from an ANC system of the vehicle 102 and/or one or more in-vehicle microphones, which can also indicate the presence of the vehicle occupant 302 to the application 118 (e.g., when a detected noise or sound level is greater than a certain threshold noise level).

As previously described, upon detecting the occupant 302 unattended in the vehicle 102, the application 118 may alert the user of the primary user device 110 and/or open one or more of the window(s) 202, 204, 206, 208. In some example, the application 118 calculates and/or determines one or more dimensions 308 of the occupant 302 based on the received sensor data, such as any of a height, a width, a length, a size, etc. In such examples, the application 118 may open one or more of the windows 202, 204, 206, 208 of the vehicle 102 based on the dimension(s) 222. For example, the application 118 may partially roll down a closed window 202, 204, 206, 208 by a certain degree, thereby providing a window opening having a size that is substantially smaller than the size of the occupant 302, which allows the vehicle cabin 210 to vent and/or cool while preventing the occupant 302 from exiting the cabin 210 through the window opening.

As discussed above, output of the window actuator(s) 106 causes respective one(s) of the vehicle window(s) 202, 204, 206, 208 to move and/or change position. For example, in FIG. 3, a first one of the window actuator(s) 106 is installed in a door 310 of the vehicle 102, as represented by the dotted/dashed lines of FIG. 3. The first one of the window actuator(s) 106 is operatively coupled to the first vehicle window 202 via a first regulator assembly 312. The first regulator assembly 312 is also represented by the dotted/dashed lines of FIG. 3. In particular, the first regulator assembly 312 of FIG. 3 is configured to transfer output from the first one of the window actuator(s) 106 to the first window 202, thereby moving the first window 202 in a first direction (e.g., a vertical or upward direction) 314 or a second direction 316 opposite the first direction 314. That is, the first regulator assembly 312 connects the first one of the window actuator(s) 106 to the first vehicle window 202, such that energy is transmittable through the first regulator assembly 312 from the first one of the window actuator(s) 106 to the first window 202. Additionally, the first regulator assembly 312 may be structured to guide movement of the first window 202 as the first window 202 moves between different window positions. In some examples, when the first one of the window actuator(s) 106 ceases generating output, the first regulator assembly 312 maintains a position of the first window 202 and/or otherwise holds the first window 202 in place.

While FIG. 3 depicts aspects in connection with the first window 202 and the first regulator assembly 312, it should be understood that the vehicle 102 can be provided with multiple regulator assemblies to facilitate moving the other windows 204, 206, 208, each of which may be installed a door of the vehicle 102, similar to the first regulator assembly 312.

Figure 4:
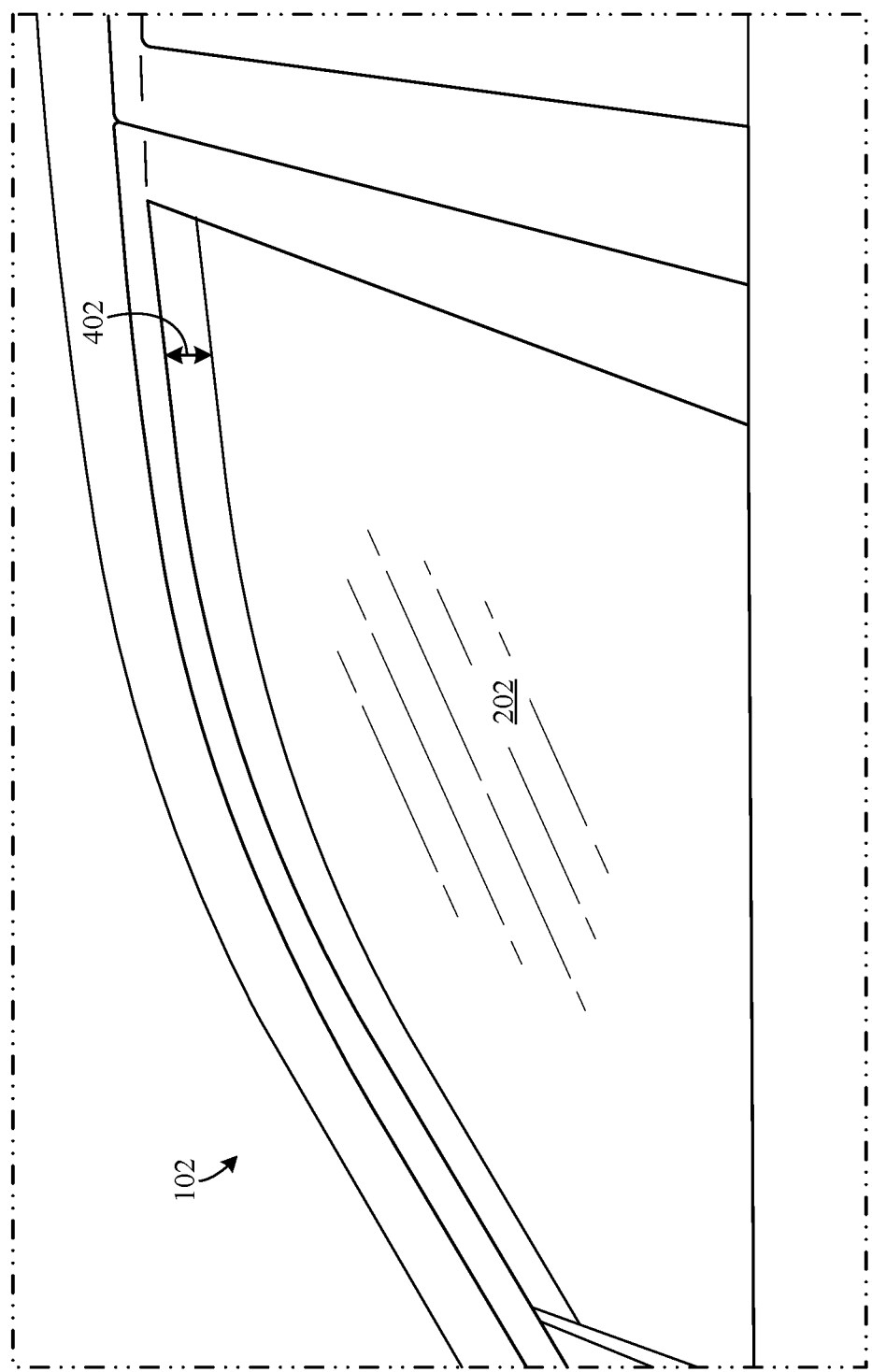
FIG. 4 is an enlarged-portion view of the example vehicle of FIG. 1A and shows a window thereof.

FIG. 4 is an enlarged-portion view of the vehicle 102 of FIG. 1A and shows the first window 202 thereof. The first window 202 of FIG. 4 is in a target window position provided by the application 118, wherein a certain opening 402 (sometimes referred to as a window opening) is defined by an edge of the first window 202 and part of the vehicle 102. In some examples, the size of the opening 402 shown in FIG. 4 may be relatively small, for example, such that a person cannot fit their hand(s), wrist(s), and/or finger(s) through the opening 402. In such examples, the target window position shown in FIG. 4 can be a predefined position stored in the second database 160.

In some examples, the target window position shown in FIG. 4 is calculated and/or determined by the application 118 (e.g., in real-time), for example, if the object of interest 212 is a small animal or critter. For example, the application 118 determines the target window position based on the dimension(s) 222 of the detected object of interest 212 and moves, via the window actuator(s) 106, the first window 202 to the target window position to prevent the object of interest 212 from the entering the vehicle cabin 210 while the vehicle cabin 210 is venting. In other examples, the application 118 determines the target window position based on the dimension(s) 308 of the detected occupant 302 and moves, via the window actuator(s) 106, the first window 202 to the target window position to prevent the occupant from exiting the vehicle cabin 210 while the vehicle cabin 210 is venting. In such examples, the resulting opening 402 has a size that is smaller than a detected size of the object of interest 212 and/or a detected size of the occupant 302.

Figure 5:
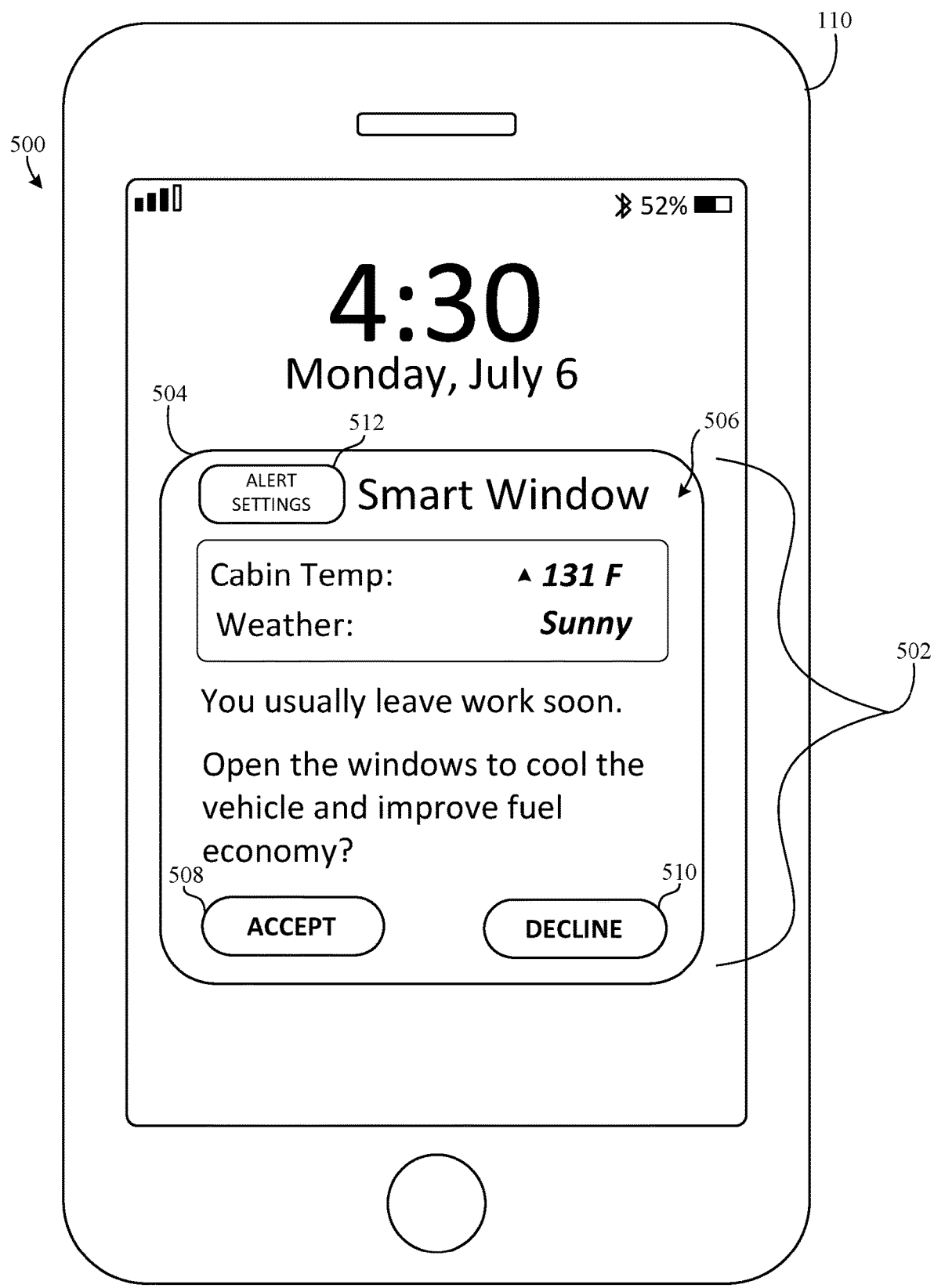
FIG. 5 illustrates a display of an example graphical user interface associated with the example user device shown in FIG. 1A.

FIG. 5 illustrates a first example screen or graphic display 500 of the primary user device 110 shown in FIG. 1A or the GUI 132 thereof and shows a first example alert 502 (e.g., generated by the alert generator 156) in accordance with the teachings of this disclosure. The first alert 502 includes, for example, one or more example messages or notifications viewable and/or observable by the user of the primary user device 110. For example, based on data transmitted from the communicator 152 and/or the alert dispatcher 120 to the primary user device 110, the first graphic display 500 generates a first window 504 that visually displays (e.g., via text) a first notification 506 of the first alert 502.

In some examples, the first alert 502 of FIG. 5 includes (e.g., encoded and/or embedded therein by the alert genera-tor 156) information specific to the vehicle 102 and/or the detected condition or status of the vehicle 102, which aids the user in making a determination regarding control action(s) the application 118 could perform. As shown in FIG. 5, the first notification 506 informs the user with respect to cabin temperature of the vehicle 102 (e.g., any of current temperature, a rate of change in the temperature, etc.) as well as the weather for the location of the vehicle 102. Further, the first notification 506 of FIG. 5 requests permission from the user to open the windows 202, 204, 206, 208 of the vehicle 102.

According to the illustrated example of FIG. 5, the first display 500 allows the user to enter or provide information to the application 118 and/or the alert dispatcher 120 via the GUI 132. In particular, the first display 500 provides for user inputs with respect to decisions and/or selections of the user. Further, the first display 500 provides for user inputs with respect to information or data associated with responding to the first alert 502. For example, the user of the primary user device 110 can submit a confirmation to the application 118 by providing one or more inputs such as via typing, talking, touching (e.g., using a screen responsive to touch) and/or other input methods. In some examples, the user can submit or provide the confirmation via a selection input such as, for example, selecting an accept button 508. Such a confirmation enables the application 118 to carry out control strategies disclosed herein associated with venting and/or cooling the vehicle cabin 210. On the other hand, if the user does not want to vent and/or cool the vehicle cabin 210, the user can decline via a different selection input such as, for example, selecting a decline button 510, which prevents the application 118 from carrying out the control strategies.

Additionally, in some examples, the user of the primary user device 110 can change or configure the aforementioned preference(s) or setting(s) of the application 118, for example, by selecting a settings button 512. Selecting the settings button 512 may, for example, cause the first display 500 to generate a different window having dynamic selection fields corresponding to the respective setting(s) and/or preference(s) of the application 118. As previously described, the user may configure the application 118 to automatically and/or actively cool the vehicle cabin 210 in certain scenarios. In such examples, instead of requesting for permission, the first notification 506 of FIG. 5 may inform the user that automatic temperature control features have been activated.

Figure 6:
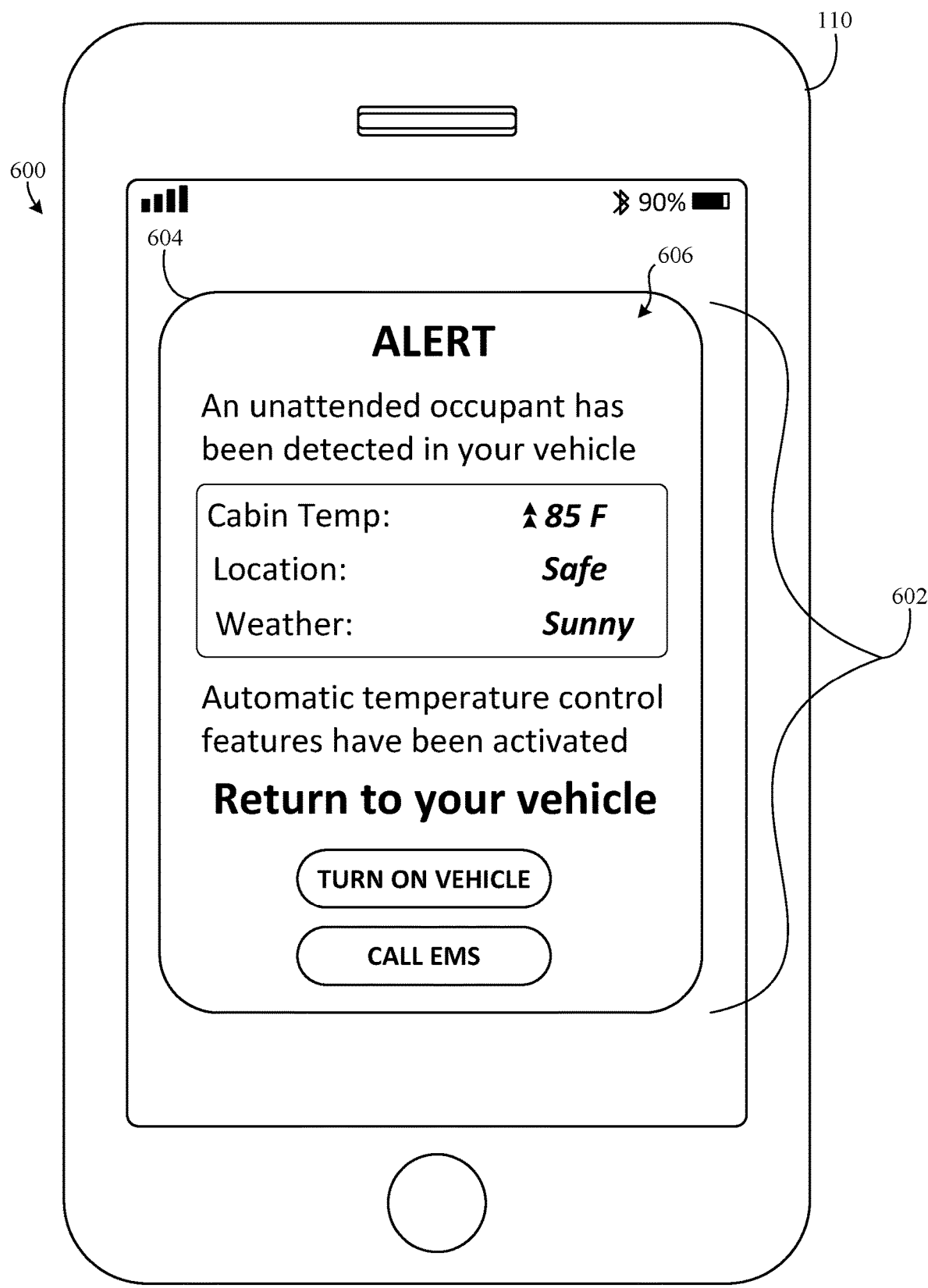
FIG. 6 illustrates an additional display of an example graphical user interface associated with the example user device shown in FIG. 1A.

FIG. 6 illustrates a second example screen or graphic display 600 of the primary user device 110 shown in FIG. 1A or the GUI 132 thereof and shows a second example alert 602 (e.g., generated by the alert generator 156) in accordance with the teachings of this disclosure. The second alert 602 includes, for example, one or more example messages or notifications viewable and/or observable by the user of the primary user device 110. For example, based on data transmitted from the communicator 152 and/or the alert dispatcher 120 to the primary user device 110, the second graphic display 600 generates a second window 604 that visually displays (e.g., via text) a second notification 606 of the second alert 602. According to the illustrated example of FIG. 6, the second notification 606 informs the user of the primary user device 110 with respect to the occupant 302 unattended in the vehicle 102 and/or instructs the user to return to the vehicle 102. Additionally or alternatively, similar to the first notification 506, the second notification 606 can inform the user with respect to the cabin temperature of the vehicle 102 as well as the weather for the location of the vehicle 102, as shown in FIG. 6. Further, the second notification 606 can inform the user with respect to relative safety of the location of the vehicle 102 and/or whether a detected person or animal is near the vehicle 102.

Similar to the first display 500, the second display 600 of FIG. 6 allows the user of the primary user device 110 to enter or provide information to the application 118 and/or the alert dispatcher 120 via the GUI 132. In particular, the second display 600 provides for user inputs with respect to information or data associated with responding to the second alert 602. As shown in FIG. 6, the second notification 606 provides the user with a selectable option to turn on the vehicle 102 and/or start the HVAC system 112 in order to rapidly cool the cabin 210 of the vehicle 102 and reduce risk(s) to the occupant 302. Additionally, the second notification 606 can provide the user with a selectable option to call emergency services.

While example alerts 502, 602 are depicted in FIGS. 5 and 6, it should be understood that the primary user device 110 can alert the user thereof in any other suitable manner, such that the primary user device 110 sufficiently informs the user with respect to the detected vehicle status and/or enables the user to respond. Of course, the first notification 506 and/or the second notification 606 could include different language, phrasing, and/or text other than that shown in the illustrated examples of FIGS. 5 and 6. Additionally or alternatively, the first notification 506 and/or the second notification 606 could be implemented using any one or more of symbols, pictures, images, videos, etc., any other suitable multimedia and/or notification technique(s), or a combination thereof. Further, the primary user device 110 of FIG. 5 can be configured to generate one or more sounds (e.g., any of a chime, natural language speech, etc.) when the primary user device 110 receives such an alert 502, 602, which increases a likelihood that the user of the primary user device 110 will notice and/or appropriately respond to the alert 502, 602.

Further, the above-described displays 500, 600 are depicted to display portions of the data/information (e.g., summarized data/information) stored in the second database 160. However, the graphic displays 500, 600 may display additional or all of the data/information stored in the second database 160. In such examples, the user may view some or all of the data/information stored in the second database 160 by, for example, providing particular inputs to the GUI 132 of the primary user device 110.

Flowcharts representative of example hardware logic or machine-readable instructions for implementing the example smart window application 118 are shown in FIGS. 7, 8A, 8B, and 9-11. The machine-readable instructions may be a program or portion of a program for execution by a processor such as the processor 1202 shown in the example processor platform 1200, which is discussed in greater detail below in connection with FIG. 12. The program may be embodied in software stored on a tangible machine-readable storage medium such as a CD-ROM, a floppy disk, a hard drive, or a memory associated with the processor 1202, but the entire program and/or parts thereof could be alternatively executed by a different device and/or embodied in firmware or dedicated hardware. Further, although the example program is described with reference to the flowcharts illustrated in FIGS. 7, 8A, 8B, and 9-11, many other methods of implementing the example smart window application 118 may alternatively be used. For example, the order of execution of the blocks may be changed, and/or some of the blocks described may be changed, eliminated, or combined. Additionally or alternatively, any of the blocks may be implemented by one or more hardware circuits (e.g., discrete and/or integrated analog and/or digital circuitry, logic circuit, a comparator, etc.).

As mentioned above, the example processes of FIGS. 7, 8A, 8B, and 9-11 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and exclude propagating signals and all transmission media. Additionally or alternatively, the example process of FIGS. 7, 8A, 8B, and 9-11 may be implemented using coded instructions stored on a non-transitory machine-readable medium in which information is stored for any duration, which includes any type of computer or machine readable storage device or disk and excludes propagating signals and transmission media.

Figure 7:
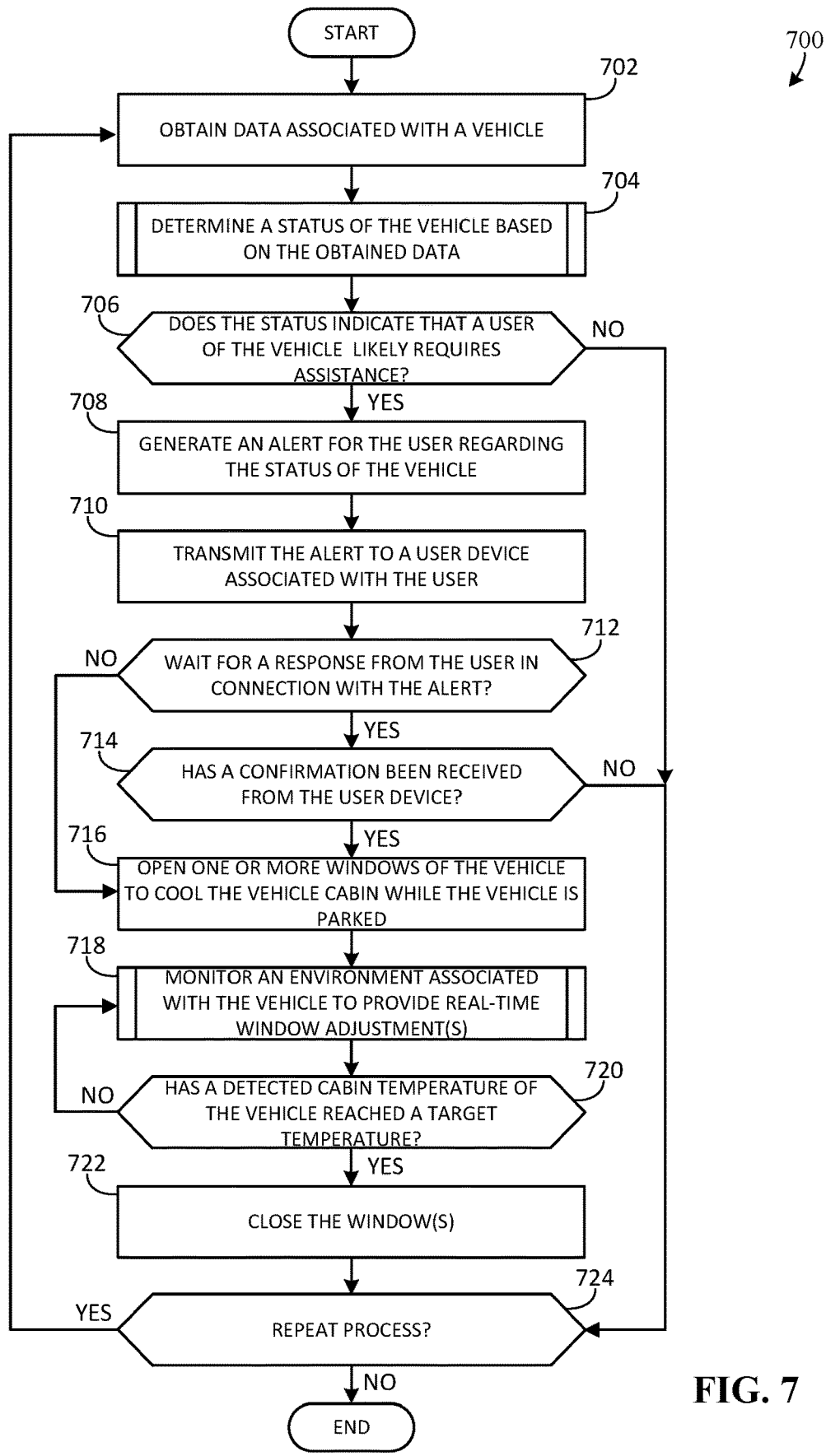
FIG. 7 illustrates a flowchart representative of an example method that can be carried out to cool a cabin of a vehicle while the vehicle is stationary.

FIG. 7 illustrates a flowchart representative of an example method 700 that can be executed to cool a cabin of a vehicle while the vehicle is stationary (e.g., parked and/or off). The example method 700 of FIG. 7 can be implemented using any of the smart window application 118, the alert dispatcher 120, and/or the GUI 132 of the primary user device 110.

The example method 700 of FIG. 7 begins by obtaining data associated with a vehicle (block 702). In some examples, the communicator 152 and/or the vehicle interface 162 obtain data associated with the vehicle 102, for example, from any of the sensor(s) 108, the vehicle system(s) 112, 114, and/or the resource(s) 126. As previously described, while the vehicle 102 is stationary, the smart window application 118 can receive (e.g., continuously and/or repeatedly) sensor data, for example, from any of the GPS of the vehicle 102, the camera(s) 214, the LiDAR sensor(s) 216, the temperature sensor(s) 228, the seat weight sensor(s) 306, the ANC system, the in-vehicle microphones, and the like. Additionally, the smart window application 118 can receive other data of interest associated with the vehicle 102 from at least one of the resource(s) 126, such as any of weather information for the location of the vehicle 102, crime information for the location of the vehicle 102, and the like. As such, at least some of the data obtained at block 702 corresponds to an environment associated with the vehicle 102 such as, for example, the first environment 200 and/or the second environment 304. In other examples, the smart window application 118 receives data associated with the user from the primary user device 110 or the first database 134, which includes data that can be advantageously used to determine or predict when the user will arrive at and/or drive the vehicle 102. In any case, the smart window application 118 may continuously and/or repeatedly obtain such data (i.e., new or updated data) during the example method 700 of FIG. 7.

The example method 700 of FIG. 7 also includes determining a status of the vehicle based on the obtained data (block 704). In some examples, the data analyzer 154 determines a status of the vehicle 102 based on at least some of the data obtained at block 702. In particular, the determined status of the vehicle 102 may be associated with relatively high cabin temperature and/or an unattended occupant in the vehicle 102, as discussed in greater detail below in connection with FIGS. 8A, 8B, and 9. For example, at block 704, the smart window application 118 may at least determine that (a) a detected cabin temperature of the vehicle 102 is above the threshold temperature stored in the second database 160 and/or (b) the occupant 302 shown in FIG. 3 is unattended in the vehicle 102.

The example method 700 of FIG. 7 also includes determining whether the status indicates that a user likely requires assistance (block 706). In some examples, the data analyzer 154 determines whether the status of the vehicle 102 detected at block 704 indicates that the user of the primary user device 110 likely requires assistance, for example, in connection with cooling the cabin 210 of the vehicle 102 and/or providing aid to the occupant 302. If the smart window application 118 provides a positive determination (block 706: YES), control of the example method 700 of FIG. 7 proceeds to block 708. On the other hand, if the smart window application 118 provides a negative determination (block 706: NO), control of the example method 700 of FIG. 7 proceeds to block 724.

The example method 700 of FIG. 7 also includes generating an alert for the user regarding the status of the vehicle (block 708). In some examples, the alert generator 156 generates an alert for the user of the primary user device 110 regarding the status of the vehicle 102 detected at block 704. For example, the alert generator 156 may generate the aforementioned first alert 502 and/or the second alert 602, depending on the detected status.

The example method 700 of FIG. 7 also includes transmitting the alert to a user device associated with the user (block 710). In some examples, the communicator 152 transmits the alert(s) 502, 602 generated at block 708 to the primary user device 110, for example, directly and/or across the external network(s) 124 via the alert dispatcher 120. As previously described, when the primary user device 110 receives the alert(s) 502, 602, the graphic display(s) 500, 600 of the primary user device 110 may present (e.g., via text and/or audio) the alert(s) 502, 602 or information thereof to the user (e.g., see FIG. 5 and/or FIG. 6). Additionally, in some examples at block 710, the smart window application 118 transmits the first alert 502 to the primary user device 110 at a time before the user arrives at the vehicle 102. In such examples, prior to transmitting the first alert 502, the smart window application 118 may also determine, based on at least some of the data obtained at block 702, when the user of the primary user device 110 will drive the vehicle 102.

The example method 700 of FIG. 7 also includes determining whether to wait for a response from the user in connection with the alert (block 712). In some examples, the data analyzer 154 determines whether to wait for a response from the user in connection with the alert transmitted at block 710. As previously described, a preference or setting of the smart window application 118 may include waiting for a confirmation from the primary user device 110 before opening the window(s) 202, 204, 206, 208 of the vehicle 102. In some examples, the data analyzer 154 determines whether such a setting is active or enabled. If the smart window application 118 provides a positive determination (block 712: YES), control of the example method 700 of FIG. 7 proceeds to block 714. On the other hand, if the smart window application 118 provides a negative determination (block 712: NO), control of the example method 700 proceeds to block 716.

The example method 700 of FIG. 7 also includes determining whether a confirmation has been received from the user device (block 714). In some examples, the communicator 152 determines whether a confirmation has been received from the primary user device 110 (and/or the alert dispatcher 120). If the smart window application 118 provides a positive determination (e.g., the user selected the accept button 508 shown in FIG. 5) (block 714: YES), control of the example method 700 of FIG. 7 proceeds to block 716. On the other hand, if the smart window application 118 provides a negative determination (e.g., the user selected the decline button 510 shown in FIG. 5) (block 714: NO), control of the example method 700 of FIG. 7 proceeds to block 724.

The example method 700 of FIG. 7 also includes opening one or more windows of the vehicle to cool the vehicle cabin while the vehicle is parked (block 716). In some examples, the control interface 150 opens, via the window actuator(s) 106, any of the first window 202, the second window 204, the third window 206, and/or the fourth window 208 to vent and/or cool the vehicle cabin 210 while the vehicle 102 is parked. At block 716, the window(s) 202, 204, 206, 208 of the vehicle 102 may be partially or fully rolled down by the smart window application 118. For example, at least the first window 202 of the vehicle 102 is partially or fully rolled down at block 716 when the detected cabin temperature is greater than the threshold temperature previously described. In any case, air flows into and/or out of the vehicle cabin 210 as a result, and the temperature in the vehicle cabin 210 begins to decrease and/or approaches the target temperature stored in the second database 160.

In some examples at block 716, the smart window application 118 utilizes the determined wind parameter(s) and/or vehicle orientation to improve and/or optimize cabin venting characteristics in connection with opening the window(s) 202, 204, 206, 208. As previously described, the smart window application 118 can be configured to determine the wind direction 226 based on the weather information as well as the orientation of the vehicle 102 relative to the wind direction 226. In particular, in such examples, the smart window application 118 is configured to adjust, via multiple window actuators 106, multiple windows of the vehicle 102 (e.g., any two or more of the first window 202, the second window 204, the third window 206, and/or the fourth window 208) based on the wind direction 226 and the orientation to increase airflow in the cabin 210.

Additionally or alternatively, in some examples at block 716, if the occupant 302 has been detected in the vehicle 102, the smart window application 118 determines a target window position for open one(s) of the windows 202, 204, 206, 208 based on the detected dimension(s) 308 of the occupant 302. In such examples, the smart window application 118 moves, via the window actuator(s) 106, one or more (e.g., all) of the windows 202, 204, 206, 208 to the target window position to prevent the occupant 302 from exiting the vehicle cabin 210 while the vehicle cabin 210 is venting.

The example method also includes monitoring an environment associated with the vehicle to provide real-time window adjustment(s) (block 718). In some examples, the smart window application 118 monitors the first environment 200 to provide one or more real-time window adjustments. For example, while the window(s) 202, 204, 206, 208 is/are open, the smart window application 118 can obtain (e.g., via the communicator 152 and/or the vehicle interface 162) and process new or updated data that corresponds to the first environment 200 and/or is associated with the vehicle 102. In particular, the smart window application 118 adjusts, via the window actuator(s) 106, the window(s) 202, 204, 206, 206 in real-time based on such data. As previously described, the smart window application 118 can detect, based on the data, a certain event and/or change in the first environment 200 and rapidly adjust (e.g., close) the window(s) 202, 204, 206, 208 via the window actuator(s) 106 in response to the detection.

The example method 700 of FIG. 7 also includes determining whether a detected cabin temperature of the vehicle has reached a target temperature (block 720). In some examples, the data analyzer 154 determines whether a cabin temperature (e.g., detected by the vehicle interface 162) of the vehicle 102 has reached the target temperature. The target temperature could be, for example, 70 degrees Fahrenheit (° F.), 80° F., 90° F., etc., or any other appropriate value. If the smart window application 118 provides a positive determination (block 720: YES), control of the example method 700 of FIG. 7 proceeds to block 722. On the other hand, if the smart window application 118 provides a negative determination (block 720: NO), control of the example method 700 of FIG. 7 returns to block 718. Additionally, in some examples at block 720, if the cabin temperature is approaching and/or near the target temperature, the smart window application 118 may initiate an active cooling process in connection with the HVAC system 112 in which the blower(s) 164 and/or the compressors 166 are activated prior to closing the window(s) 202, 204, 206, 208.

The example method 700 of FIG. 7 also includes closing the window(s) (block 722). In some examples, the control interface 150 closes, via the window actuator(s) 106, one or more (e.g., all) of the first window 202, the second window 204, the third window 206, and/or the fourth window 208. In such examples, the smart window application 118 may direct the window actuator(s) 106 to fully roll up all open window(s) of the vehicle 102.

The example method 700 of FIG. 7 also includes determining whether to repeat the process (block 724). In some examples, the smart window application 118 provides a positive determination (block 724: YES), and control of the example method 700 of FIG. 7 returns to block 702. On the other hand, if the smart window application 118 provides a negative determination (e.g., the user of the primary user device 110 disabled the smart window application 118) (block 724: NO), the example process ends.

Although the example method 700 is described in connection with the flowchart of FIG. 7, one or more other methods of implementing the example system 100 and/or the example smart window application 118 may alternatively be used. For example, the order of execution of the blocks 702, 704, 706, 708, 710, 712, 714, 716, 718, 720, 722, 724 may be changed, and/or at least some operations of the blocks 702, 704, 706, 708, 710, 712, 714, 716, 718, 720, 722, 724 described may be changed, eliminated, or combined.

In some examples, in addition or alternatively to opening the vehicle window(s) at block 716, the smart window application 118 can perform any one or more of the following actions: (a) turn on the vehicle 102, (b) activate the blower(s) 164, and/or (c) activate the compressor(s) 166, depending on the preference(s) or setting(s) of the application 118 and/or how the user of the primary user device 110 responds to the alert. In such examples, the smart window application 118 may control the HVAC system 112 to rapidly cool the vehicle cabin 210. Such action(s) is/are particularly advantageous, for example, if the occupant 302 is left unattended in the vehicle 102. Further, in some examples, the window(s) 202, 204, 206, 208 is/are closed in connection with the operation of block 718, prior to block 722, as will be discussed further below. Additionally, the operations of blocks 718 and 720 can occur simultaneously and/or in parallel, where a positive determination made at block 720 shifts control of the method 700 to block 722.

Figure 8A:
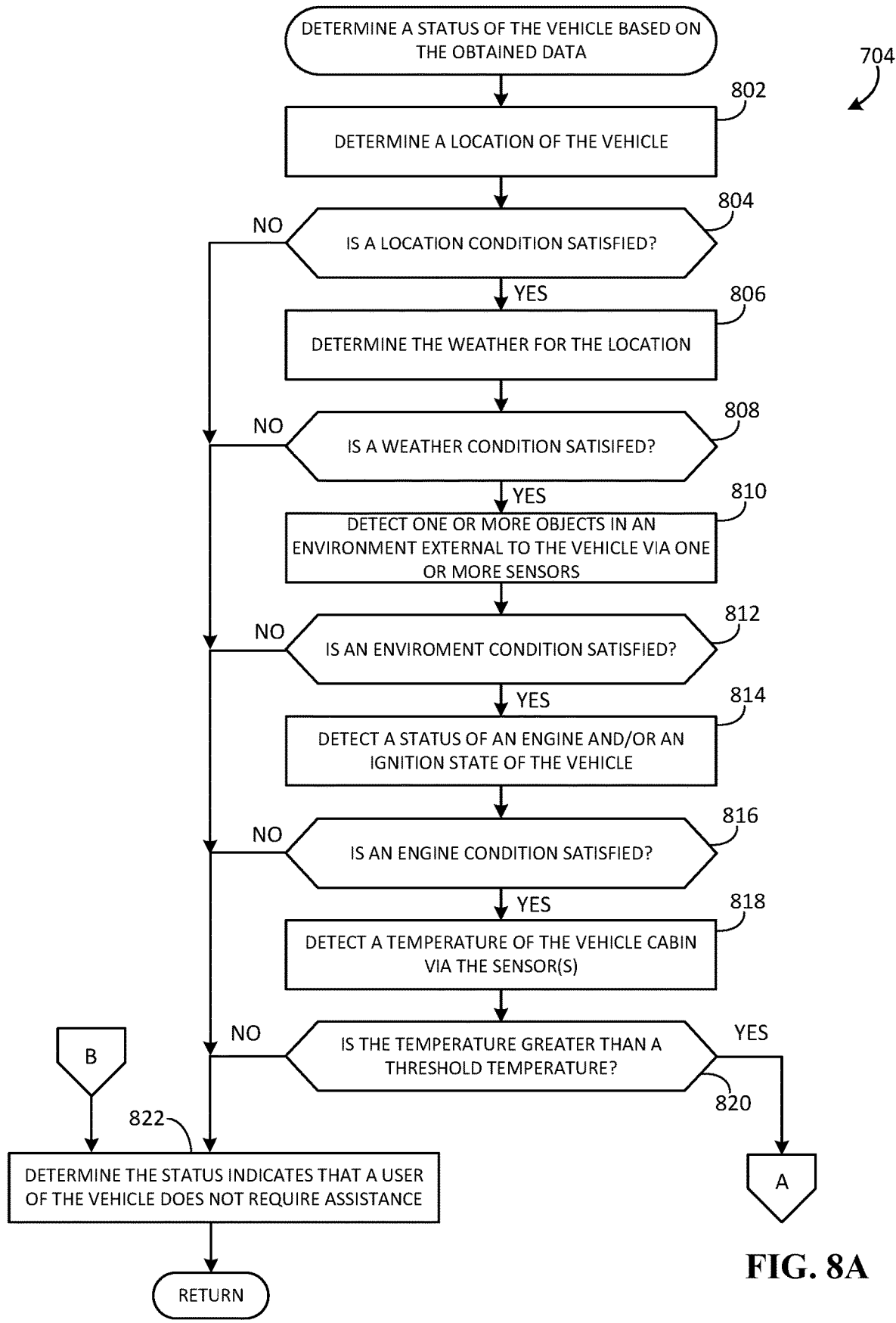
FIGS. 8A, 8B, and 9 illustrate flowcharts representative of example methods that can be carried out to determine a condition or status of a vehicle based on obtained data associated with the vehicle.
Figure 8B:
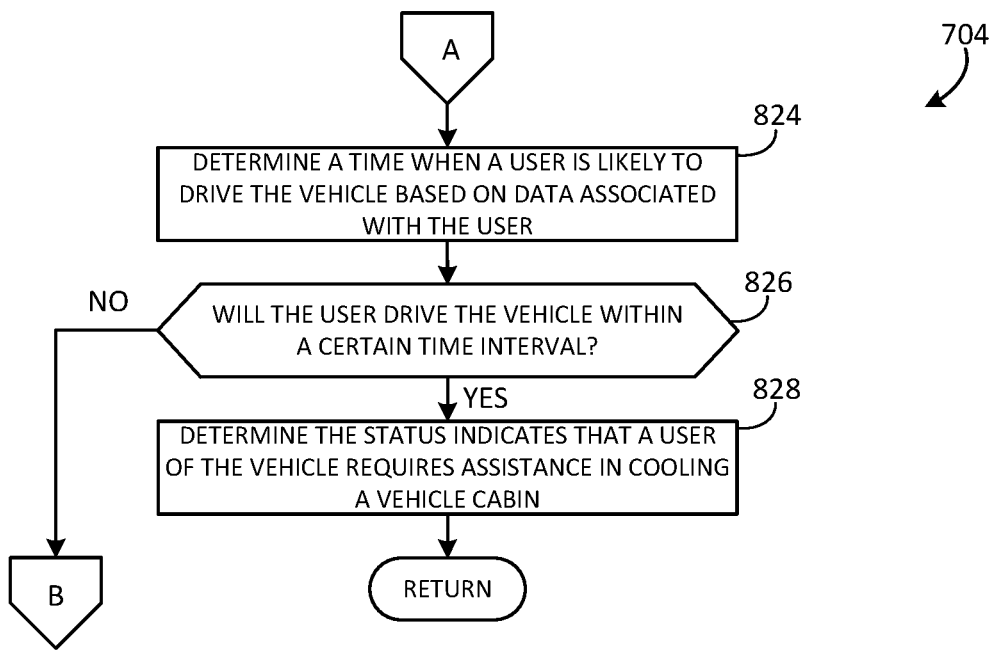

FIGS. 8A and 8B illustrate a flowchart representative of an example method 704 that can be carried out to determine a condition or status of a vehicle based on obtained data associated with the vehicle. The example method 704 of FIGS. 8A and 8B can be implemented, for example, using the smart window application 118. Operations of the blocks 802, 804, 806, 808, 810, 812, 814, 816, 818, 820, 822, 824, 826, 828 of FIGS. 8A and 8B may be used to implement block 704 of FIG. 7.

Turning to FIG. 8A, the example method 704 begins by determining a location of the vehicle (block 802). In some examples, the data analyzer 154 determines the location of the vehicle 102, for example, based on at least some of the data obtained at block 702 including positional data that is associated with vehicle 102. Such positional data may be collected by the GPS in the vehicle 102 with respect to a current location of the vehicle 102. In such examples, the vehicle interface 162 can communicate with the GPS to receive the positional data from the GPS.

The example method 704 also includes determining whether a location condition is satisfied (block 804). In some examples, the data analyzer 154 determines whether a location condition stored in the second database 160 is satisfied. The location condition is satisfied, for example, if the vehicle 102 is parked in a certain area (e.g., an area associated with relatively low crime) designated and/or authorized by the user of the primary user device 110. If the smart window application 118 provides a negative determination (block 804: NO), control of the example method 704 proceeds to block 822. On the other hand, if the smart window application 118 provides a positive determination (block 804: YES), control of the example method 704 proceeds to block 806.

The example method 704 also includes determining the weather for the location (block 806). In some examples, the data analyzer 154 determines the weather for the location of the vehicle 102, for example, based on at least some of the data obtained at block 702 including the weather information for the location provided by the resource(s) 126.

The example method 704 also includes determining whether a weather condition is satisfied (block 808). In some examples, the data analyzer 154 determines whether a weather condition stored in the second database 160 is satisfied. The weather condition is satisfied, for example, if the weather for the location of the vehicle 102 matches a predetermined type of weather (e.g., stored in the second database 160). In some examples, the predetermined type of weather can be any of hot, sunny, cloudy, humid, dry, and the like, or a combination thereof, where the environment elements 224 are negligible or not substantially present in the first environment 200. If the smart window application 118 provides a negative determination (e.g., the weather for the location does not match the predetermined type of weather) (block 808: NO), control of the example method 704 proceeds to block 822. In such examples, the negative determination may be provided when the weather for the location of the vehicle 102 includes, for example, a storm (e.g., a dust storm, a sand storm, a rain storm, a thunderstorm, etc.), where the environmental elements 224 are typically present in the first environment 200 and may harm the interior of the vehicle 102. On the other hand, if the smart window application 118 provides a positive determination (e.g., the weather for the location matches the predetermined type of weather) (block 808: YES), control of the example method 704 proceeds to block 810.

The example method 704 also includes detecting one or more objects in an environment external to the vehicle via one or more sensors (block 810). In some examples, the smart window application 118 detects one or more objects in the first environment 200 via the sensor(s) 108. For example, as previously described, the smart window application 118 can advantageously utilize the camera(s) 214 and/or the LiDAR sensor(s) 216 to detect the object of interest 212 shown in FIG. 2.

The example method 704 also includes determining whether an environment condition is satisfied (block 812). In some examples, the data analyzer 154 determines whether an environment condition stored in the second database 160 is satisfied. The environment condition is satisfied, for example, if none of the object(s) detected at block 810 is proximate to and/or approaching the vehicle. For example, with respect to the object of interest 212 shown in FIG. 2, the environment condition may be satisfied if the distance 218 between the object of interest 212 and the vehicle 102 is greater than the threshold distance 220. If the smart window application 118 provides a positive determination (block 812: YES), control of the example method 704 proceeds to block 814. On the other hand, if the smart window application 118 provides a negative determination (block 812: NO), control of the example method 704 proceeds to block 822.

The example method 704 also includes detecting a status of an engine and/or an ignition state of the vehicle (block 814). In some examples, the vehicle interface 162 detects a status of an engine and/or an ignition state of the vehicle 102, for example, based on at least some of the data obtained at block 702. For example, the vehicle interface 162 can communicate with one or more ECUs (e.g., an engine ECU, an ignition control module, etc.) of the vehicle 102 to receive related data and/or one or more signals from the vehicle ECU(s) indicative of the status of the engine and/or the ignition state. Additionally or alternatively, the vehicle interface 162 can similarly communicate with an ignition key sensor in the vehicle 102 to receive related data from the ignition key sensor.

The example method 704 also includes determining whether an engine condition is satisfied (block 816). In some examples, the data analyzer 154 determines whether an engine condition stored in the second database 160 is satisfied. The engine condition is satisfied, for example, if the engine of the vehicle 102 is off. Additionally or alternatively at block 816, the data analyzer 154 determines whether keys are in the ignition of the vehicle 102. If the smart window application 118 provides a negative determination (e.g., the engine is on and/or the keys are in the ignition) (block 816: NO), control of the example method 704 proceeds to block 822. On the other hand, if the smart window application 118 provides a positive determination (e.g., the engine is off and no keys are in the ignition) (block 816: YES), control of the example method 704 proceeds to block 818.

The example method 704 also includes detecting a temperature of the vehicle cabin via the sensor(s) (block 818). In some examples, the vehicle interface 162 detects a temperature of the vehicle cabin 210 via the sensor(s) 108. For example, the vehicle interface 162 communicates with the temperature sensor(s) 228 of FIG. 2 to receive sensor data indicative of cabin temperature from the temperature sensor(s) 228.

The example method 704 also includes determining whether the temperature is greater than a threshold temperature (block 820). In some examples, the data analyzer 154 determines whether the temperature detected at block 818 is greater than the threshold temperature stored in the second database 160. The threshold temperature could be, for example, 90° F., 100° F., 110° F., etc., or any other appropriate value greater than the target temperature. If the smart window application 118 provides a negative determination (e.g., the temperature of the vehicle cabin 210 is less than or equal to the threshold temperature) (block 820: NO), control of the example method 704 proceeds to block 822. On the other hand, if the smart window application 118 provides a positive determination (e.g., the temperature of the vehicle cabin 210 is greater than the threshold temperature) (block 820: YES), control of the example method 704 proceeds to block 824 shown in FIG. 8B.

The example method 704 also includes determining the status indicates that a user of the vehicle does not require assistance (block 822). In some examples, if at least one of the conditions in connection with blocks 804, 808, 812, 816, 820, and 826 (described below) is not satisfied, the smart window application 118 determines the status of the vehicle 102 indicates that a user of the vehicle 102 does not require assistance. After performing the operation of block 822, the example process returns to a calling function such as the example method 700 of FIG. 7.

Turning to FIG. 8B, the example method 704 also includes determining a time when a user is likely to drive the vehicle based on data associated with the user (block 824). In some examples, the smart window application 118 determines a time when the user of the primary user device 110 is likely to drive the vehicle 102 based on at least some of the data obtained at block 702 including data associated with the user. As previously described, to make such a determination, the smart window application 118 may, for example, analyze habits and/or patterns of the user with respect to vehicle usage.

The example method 704 also includes determining whether the user will drive the vehicle within a certain time interval (block 826). In some examples, the data analyzer 154 determines whether the user of the primary user device 110 will drive the vehicle 102 within a certain time interval (e.g., 5 minutes, 10 minutes, 30 minutes, etc.). The time interval may be relatively short, while still allowing the vehicle cabin 210 to substantially cool by means of opening the window(s) 202, 204, 206, 208, activating the blower(s) 164, and/or activating the compressor(s) 166. If the smart window application 118 provides a negative determination (block 826: NO), control of the example method 704 proceeds to block 822 shown in FIG. 8A. On the other hand, if the smart window application 118 provides a positive determination (block 826: YES), control of the example method 704 proceeds to block 828.

The example method 704 also includes determining the status indicates that a user of the vehicle requires assistance in cooling a vehicle cabin (block 824). In some examples, if all of the conditions in connection with blocks 804, 808, 812, 816, 820, and 826 are satisfied, the smart window application 118 determines the status of the vehicle 102 indicates that a user of the vehicle 102 (e.g., the user of the primary user device 110) requires assistance in cooling the cabin 210. After performing the operation of block 828, the example process returns to a calling function such as the example method 700 of FIG. 7.

Although the example method 704 is described in connection with the flowchart of FIGS. 8A and 8B, one or more other methods of implementing the example smart window application 118 may alternatively be used. For example, the order of execution of the blocks 802, 804, 806, 808, 810, 812, 814, 816, 818, 820, 822, 824, 826, 828 may be changed, and/or at least some operations of the blocks 802, 804, 806, 808, 810, 812, 814, 816, 818, 820, 822, 824, 826, 828 described may be changed, eliminated, or combined. In some examples, the smart window application 118 may also check initial positions of the respective windows 202, 204, 206, 208 and/or determine whether one or more windows 202, 204, 206, 208 of the vehicle 102 is/are already open.

Figure 9:
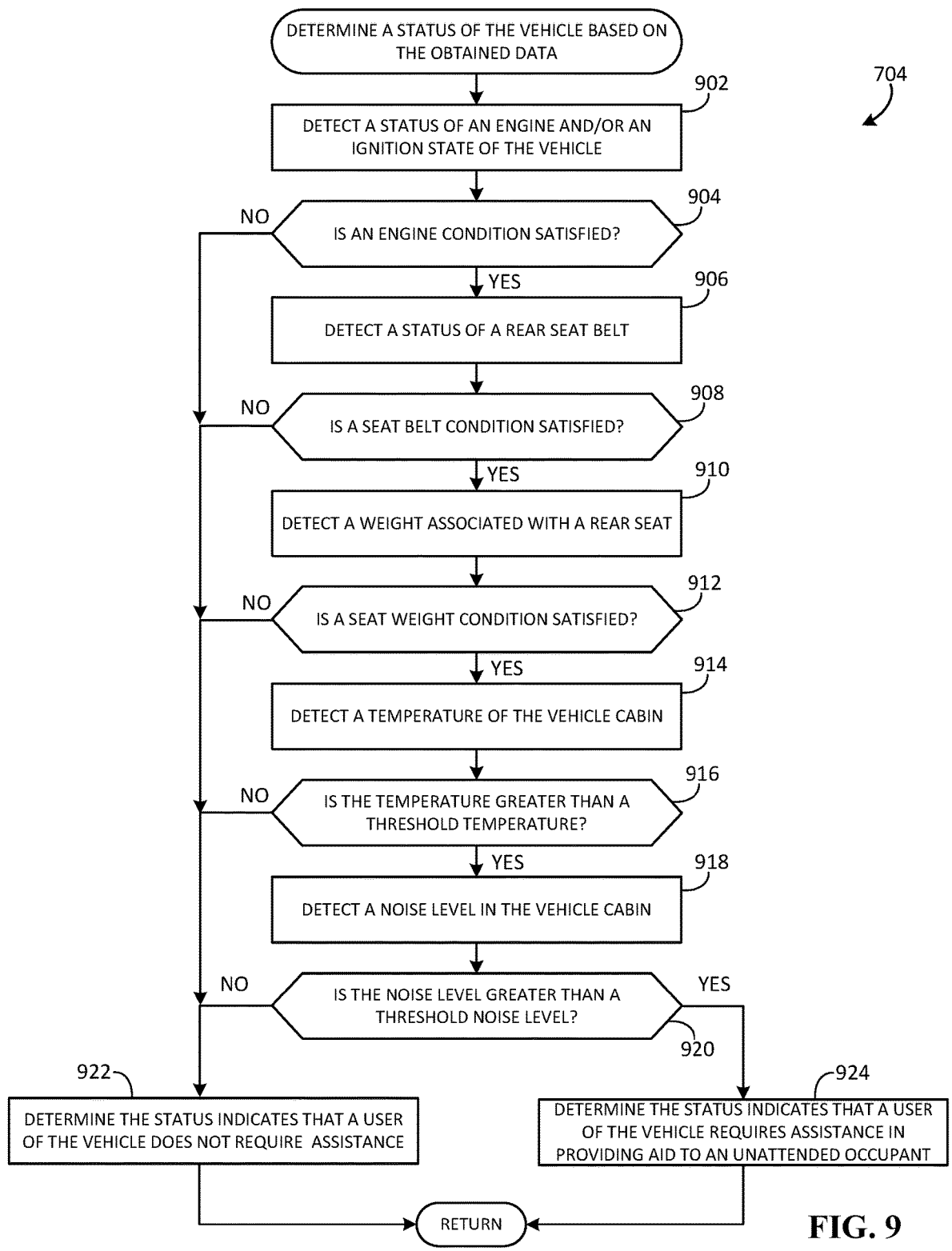

FIG. 9 illustrates a flowchart representative of another example method 704 that can be carried out to determine a condition or status of a vehicle based on obtained data associated with the vehicle. The example method 704 of FIG. 9 can be implemented, for example, using the smart window application 118. Operations of the blocks 902, 904, 906, 908, 910, 912, 914, 916, 918, 920, 922, 924 of FIG. 9 may be used to implement block 704 of FIG. 7.

The example method 704 of FIG. 9 begins by detecting a status of an engine and/or an ignition state of the vehicle (block 902). In some examples, the vehicle interface 162 detects the status of the engine and/or the ignition state of the vehicle 102, as previously described.

The example method 704 of FIG. 9 also includes determining whether an engine condition is satisfied (block 804). In some examples, the data analyzer 154 determines whether the engine condition stored in the second database 160 is satisfied. If the smart window application 118 provides a negative determination (e.g., the engine of the vehicle 102 is on and/or the keys are in the ignition) (block 904: NO), control of the example method 704 proceeds to block 922. On the other hand, if the smart window application 118 provides a positive determination (e.g., the engine is off and/or no keys are in the ignition) (block 904: YES), control of the example method 704 proceeds to block 906.

The example method 704 of FIG. 9 also includes detecting a status of a rear seat belt (block 906). In some examples, the vehicle interface 162 detects a status of a rear seat belt of the vehicle 102. Such detection can be made via the sensor(s) 108 and/or the other vehicle system(s) 114. For example, the vehicle interface 162 can communicate with the seat belt sensor(s) in the vehicle 102, which provide the vehicle interface 162 with sensor data indicative of the status of the rear seat belt or a different rear seat belt.

The example method 704 of FIG. 9 also includes determining whether a seat belt condition is satisfied (block 908). In some examples, the data analyzer 154 determines whether a seat belt condition stored in the second database 160 is satisfied. The seat belt condition is satisfied, for example, if at least one rear seat belt in the vehicle 102 is in a buckled state. If the smart window application 118 provides a negative determination (block 908: NO), control of the examples method 704 of FIG. 9 proceeds to block 922. On the other hand, if the smart window application 118 provides a positive determination (block 908: YES), control of the example method 704 of FIG. 9 proceeds to block 910.

The example method 704 of FIG. 9 also includes detecting a weight associated with a rear seat (block 910). In some examples, the vehicle interface 162 detects a weight associated with a rear seat in the vehicle cabin 210. Such detection can be made via the sensor(s) 108 and/or the other vehicle system(s) 114. For example, the vehicle interface 162 communicates with the seat weight sensor(s) 306 of FIG. 3 to receive related sensor data from the sear weight sensor(s) 306 that is indicative of the weight.

The example method 704 of FIG. 9 also includes determining whether a seat weight condition is satisfied (block 912). In some examples, the data analyzer 154 determines whether a seat weight condition stored in the second database 160 is satisfied. The seat weight condition is satisfied, for example, if the weight detected at block 910 is greater than a weight threshold (e.g., stored in the second database 160). The weight threshold can include a value representing a certain weight associated with a relatively small occupant, such as any of a child, a pet, etc. If the smart window application 118 provides a negative determination (block 912: NO), control of the example method 704 of FIG. 9 proceeds to block 922. On the other hand, if the smart window application 118 provides a positive determination (block 912: YES), control of the example method 704 of FIG. 9 proceeds to block 914.

The example method 704 of FIG. 9 also includes detecting a temperature of the vehicle cabin (block 914). In some examples, the vehicle interface 162 detects the temperature of the vehicle cabin 210 via the sensor(s) 108, as previously described.

The example method 704 of FIG. 9 also includes determining whether the temperature is greater than a threshold temperature (block 916). In some examples, the data analyzer 154 determines whether the temperature detected at block 914 is greater than the threshold temperature stored in the second database 160. If the smart window application 118 provides a negative determination (block 916: NO), control of the example method 704 of FIG. 9 proceeds to block 922. On the other hand, if the smart window application 118 provides a positive determination (block 916: YES), control of the example method 704 of FIG. 9 proceeds to block 918.

The example method 704 of FIG. 9 also includes detecting a noise level in the vehicle cabin (block 918). In some examples, the vehicle interface 162 detects a noise level in the vehicle cabin 210. Such a detection can be made via the sensor(s) 108 and/or the other vehicle system(s) 114. For example, the vehicle interface 162 can communicate with the in-vehicle microphones and/or the ANC system of the vehicle 102 to receive sensor data therefrom indicative of the noise level.

The example method 704 of FIG. 9 also includes determining whether the noise level is greater than a threshold noise level (block 920). In some examples, the data analyzer 154 determines whether the noise level detected at block 918 is greater than a threshold noise level stored in the second database 160. The threshold noise level can be a value representing a noise or sound pressure level associated with an occupant in the vehicle cabin 210. If the smart window application 118 provides a negative determination (block 920: NO), control of the example method 704 of FIG. 9 proceeds to block 922. On the other hand, if the smart window application 118 provides a positive determination (block 920: YES), control of the example method 704 of FIG. 9 proceeds to block 924.

The example method 704 of FIG. 9 also includes determining the status indicates that a user of the vehicle does not require assistance (block 922). In some examples, if at least one of the conditions in connection with blocks 904, 908, 912, 916, and 920 is not satisfied, the smart window application 118 determines the status of the vehicle 102 indicates that a user of the vehicle 102 does not require assistance. Additionally or alternatively, in some examples at block 922, the smart window application 118 may determine that the vehicle cabin 210 does not likely contain an unattended occupant. After performing the operation of block 922, control of the example process returns to a calling function such as the example method 700 of FIG. 7.

The example method 704 of FIG. 9 also includes determining the status indicates that a user of the vehicle requires assistance in providing aid to an unattended occupant (block 924). In some examples, if all of the conditions in connection with blocks 904, 908, 912, 916, and 920 are satisfied, the smart window application 118 determines the status of the vehicle 102 indicates that a user of the vehicle 102 (e.g., the user of the primary user device 110) requires assistance in providing aid to the occupant 302. Additionally or alternatively, in some examples at block 924, the smart window application 118 determines that the occupant 302 is unattended in the vehicle 102. After performing the operation of block 924, control of the example process returns to a calling function such as the example method 700 of FIG. 7.

Although the example method 704 is described in connection with the flowchart of FIG. 9, one or more other methods of implementing the example smart window application 118 may alternatively be used. For example, the order of execution of the blocks 902, 904, 906, 908, 910, 912, 914, 916, 918, 920, 922, 924 may be changed, and/or at least some operations of the blocks 902, 904, 906, 908, 910, 912, 914, 916, 918, 920, 922, 924 described may be changed, eliminated, or combined.

Figure 10:
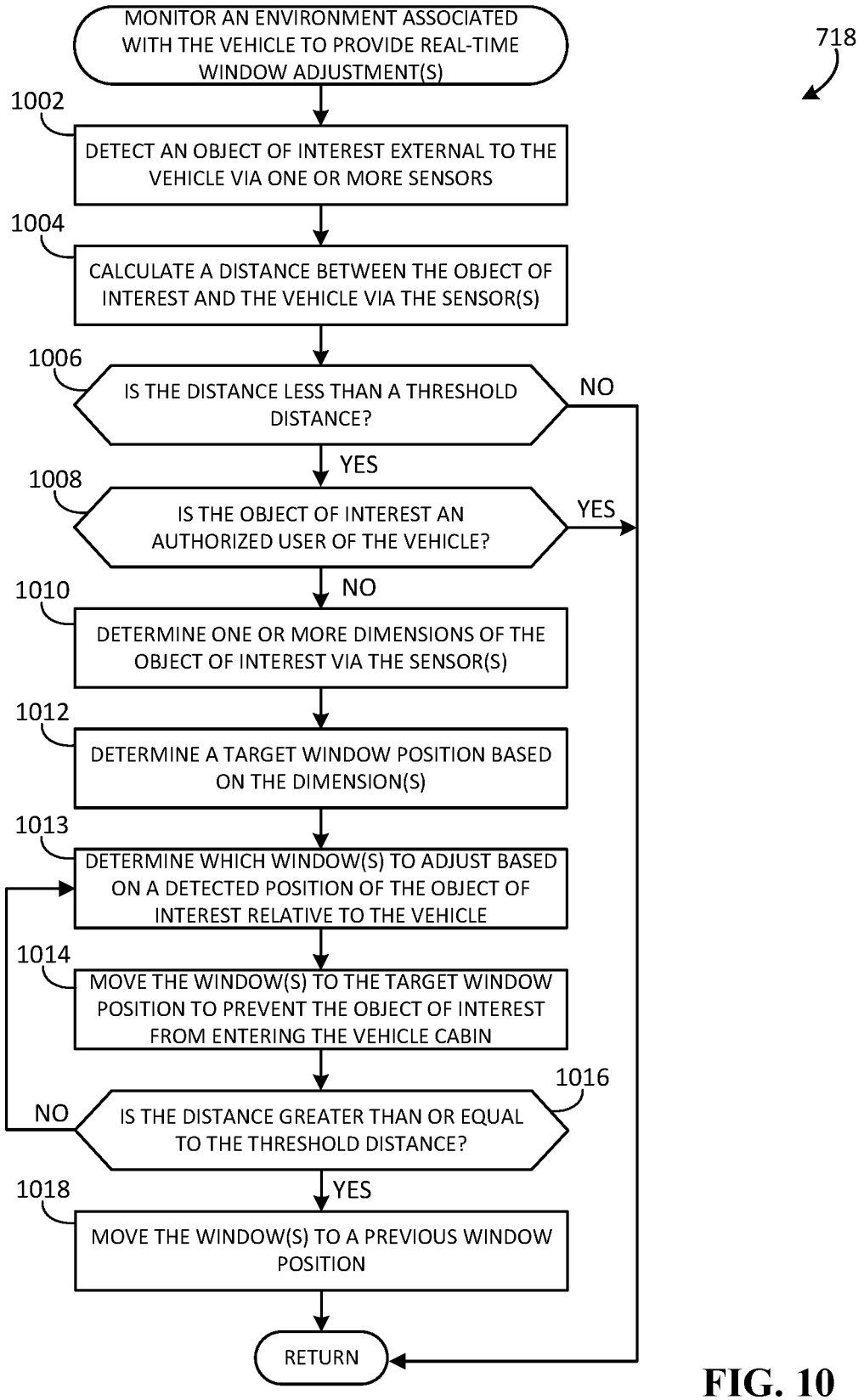
FIGS. 10 and 11 illustrate flowcharts representative of example methods that can be carried out to monitor an environment associated with a vehicle to provide one or more real-time window adjustments.

FIG. 10 illustrates a flowchart representative of example method 718 that can be carried out to monitor an environment associated with a vehicle to provide one or more real-time window adjustments. The example method 718 of FIG. 10 can be implemented, for example, using the smart window application 118. Operations of the blocks 1002, 1004, 1006, 1008, 1010, 1012, 1013, 1014, 1016, 1018 of FIG. 10 may be used to implement block 718 of FIG. 7.

The example method 718 of FIG. 10 begins by detecting an object of interest external to the vehicle via one or more sensors (block 1002). In some examples, the smart window application 118 detects the object of interest 212 shown in FIG. 2 via the sensor(s) 108, as previously described.

The example method 718 of FIG. 10 also includes calculating a distance between the object of interest and the vehicle via the sensor(s) (block 1004). In some examples, the smart window application 118 calculates the distance 218 shown in FIG. 2 via the sensor(s) 108.

The example method 718 of FIG. 10 also includes determining whether the distance is less than a threshold distance (block 1006). In some examples, the data analyzer 154 determines whether the distance 218 calculated at block 1004 is less than the threshold distance 220, for example, by comparing the distance 218 to the threshold distance 220. In particular, if the smart window application 118 provides a negative determination (block 1006: NO), the example process returns to a calling function such as the example method 700 of FIG. 7. On the other hand, if the smart window application 118 provides a positive determination (block 1006: YES), control of the example method 718 proceeds to block 1008.

The example method 718 of FIG. 10 also includes determining whether the object of interest is an authorized user of the vehicle (block 1008). In some examples, the communicator 152 determines whether the object of interest 212 detected at block 1002 is an authorized user of the vehicle 102. As previously described, the smart window application 118 may distinguish between a person and an animal or critter and/or may attempt to communicate (e.g., via the communicator 152) with the electronic device 221 proximate to the object of interest 212. For example, the communicator 152 may determine that the object of interest 212 is an authorized user of the vehicle 102 in response to successfully communicating with the electronic device 221 and verifying an identity of the object of interest 212. If the smart window application 118 provides a positive determination (block 1008: YES), control of the example method 718 of FIG. 10 returns to a calling function such as the example method 700 of FIG. 7. On the other hand, if the smart window application 118 provides a negative determination (block 1008: NO), control of the example method 718 of FIG. 10 proceeds to block 1010.

The example method 718 of FIG. 10 also includes determining one or more dimensions of the object of interest 212 via the sensor(s) (block 1010). In some examples, the smart window application 118 determines the dimension(s) 222 of the object of interest 212 via the sensor(s) 108. Such dimension(s) 222 include, for example, any of a height of the object of interest 212, a width of the object of interest 212, a length of the object of interest 212, a size of the object of interest, and the like, any other appropriate dimension(s), or a combination thereof.

The example method 718 of FIG. 10 also includes determining a target window position based on the dimension(s) (block 1012). In some examples, the adjustment engine 158 determines a target window position for the window(s) 202, 204, 206, 208 based on the dimension(s) 222. Such a target window position is associated with providing a relatively small window opening (e.g., see the opening 402 of FIG. 4), where the object of interest 212 cannot fit through the relatively small window opening. In other examples, the target window position determined at block 1012 may correspond to a fully closed window position. In any case, the smart window application 118 may store current positions of the respective windows 202, 204, 206, 208 in the second database 160 to facilitate resetting the window(s) 202, 204, 206, 208 at block 1018 when the object of interest 212 leaves.

The example method 718 of FIG. 10 also includes determining which window(s) to adjust based on a detected position of the object of interest relative to the vehicle (block 1013). In some examples, the adjustment engine 158 determines which window(s) 202, 204, 206, 208 to adjust based on the detected position of the object of interest 212 relative to the vehicle 102. For example, if the object of interest 212 is near or proximate to the first side of the vehicle 102, the data analyzer 154 may determine to adjust (e.g., close) one or more open windows corresponding to the first side of the vehicle 102 (i.e., the first window 202 and/or the second window 204), while maintaining one or more open windows corresponding to the second side of the vehicle 102 (i.e., the third window 206 and/or the fourth window 208). Alternatively, the smart window application 118 may determine to adjust all of the open window(s) of the vehicle 102, regardless of the position of the object of interest 212 relative to the vehicle 102.

The example method 718 of FIG. 10 also includes moving the window(s) to the target window position to prevent the object of interest from entering the vehicle cabin (block 1014). In some examples, the control interface 150 moves, via the window actuator(s) 106, one or more (e.g., all) of the windows 202, 204, 206, 208 to the target window position determined at block 1012 to prevent the object of interest 212 from entering the vehicle cabin 210 while the vehicle cabin 210 is venting.

The example method 718 of FIG. 10 also includes determining whether the distance is greater than or equal to the threshold distance (block 1016). In some examples, the data analyzer 154 determines whether the distance 218 (between the object of interest 212 and the vehicle 102) is greater than or equal to the threshold distance 220. In other examples, the data analyzer 154 determines whether the object of interest 212 is moving away from the vehicle 102 and/or leaving the vicinity. If the smart window application 118 provides a negative determination (block 1016: NO), control of the example method 718 of FIG. 10 returns to block 1013, where the window(s) 202, 204, 206, 208 of the vehicle 102 can be re-adjusted, for example, if the object of interest 212 is moving around the vehicle 102 from the first side to the second side. In such examples, the object of interest 212 can be tracked and/or monitored by the smart window application 118, and/or the distance 218 can be re-calculated and compared to the threshold distance 220. On the other hand, if the smart window application 118 provides a positive determination (block 1016: YES), control of the example method 718 of FIG. 10 proceeds to block 1018.

The example method 718 of FIG. 10 also includes moving the window(s) to a previous window position (block 1018). In some examples, the control interface 150 moves, via the window actuator(s) 106, one or more (e.g., all) of the windows 202, 204, 206, 208 to a previous window position, which increases air flow in the vehicle cabin 210. For example, the control interface 150 can utilize the positions of the respective windows 202, 204, 206, 208 stored in the second database 160 at block 1012.

After performing the operation of block 1018, control of the example method 718 of FIG. 10 returns to a calling function such as the example method 700 of FIG. 7.

Although the example method 718 is described in connection with the flowchart of FIG. 10, one or more other methods of implementing the example smart window application 118 may alternatively be used. For example, the order of execution of the blocks 1002, 1004, 1006, 1008, 1010, 1012, 1013, 1014, 1016, 1018 may be changed, and/or at least some operations of the blocks 1002, 1004, 1006, 1008, 1010, 1012, 1013, 1014, 1016, 1018 described may be changed, eliminated, or combined. In some example, if a negative determination is made at block 1006, control of the example method 718 of FIG. 10 can return to block 1002, where the object of interest 212 can be tracked and/or monitored, and/or the distance 218 can be re-calculated and compared to the threshold distance 220.

Figure 11:
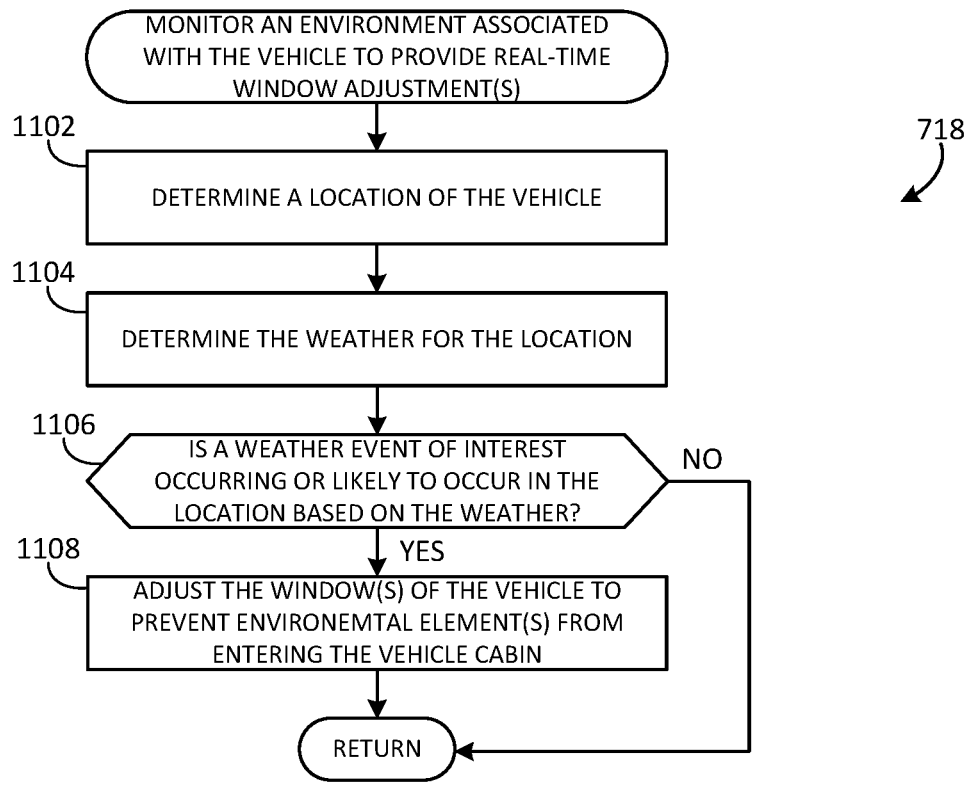

FIG. 11 illustrates a flowchart representative of another example method 718 that can be carried out to monitor an environment associated with a vehicle to provide one or more real-time window adjustments. The example method 718 of FIG. 11 can be implemented, for example, using the smart window application 118. Operations of the blocks 1102, 1104, 1106, 1108 of FIG. 11 may be used to implement block 718 of FIG. 7.

The example method 718 of FIG. 11 begins by determining a location of the vehicle (block 1102). In some examples, the smart window application 118 determines the location of the vehicle 102, as previously described.

The example method 718 of FIG. 11 also includes determining the weather for the location (block 1104). In some examples, the smart window application 118 determines the weather for the location of the vehicle 102, for example, based on the weather information received from the resource(s) 126. As previously described, the smart window application 118 may be configured to monitor the weather and, in some examples, detect a particular change in the weather based on the weather information (e.g., a change with respect to the weather determined at block 806), where the open window(s) of the vehicle 102 should be adjusted. In some such examples, the smart window application 118 may receive a weather alert for the location from the resource(s) 126 while the cabin 210 is venting such as, for example, a real-time storm alert, a real-time rain alert, and the like, which can serve as a trigger for the smart window application 118.

The example method 718 of FIG. 11 also includes determining whether a weather event of interest is occurring or likely to occur in the location based on the weather (block 1106). In some examples, the data analyzer 154 determines whether a weather event of interest is occurring or likely to occur in the location of the vehicle 102 based on the weather and/or the change therein determined at block 1104. The weather event of interest could be, for example, a dust or sand storm, rain, and the like, and/or any other weather event that may adversely affect a vehicle interior, as previously described. If the smart window application 118 provides a negative determination (block 1106: NO), the example process returns to a calling function such as the example method 700 of FIG. 7. On the other hand, in some examples, if the smart window application 118 provides a positive determination (block 1106: YES), control of the example method 718 of FIG. 11 proceeds to block 1108.

The example method 718 of FIG. 11 also includes adjusting the window(s) of the vehicle to prevent environmental element(s) from entering the vehicle cabin (block 1108). In some examples, the control interface 150 adjusts (e.g., closes), via the window actuator(s) 106, one or more (e.g., all) of the window(s) 202, 204, 206, 208 of the vehicle 102 to prevent the environmental elements 224 from entering the vehicle cabin 210 during weather event of interest. For example, each of the open window(s) of the vehicle 102 is partially or fully rolled up by the smart window application 118 at block 1108. Additionally, in some examples, the smart window application 118 is configured to adjust, via multiple window actuators 106, multiple windows of the vehicle 102 (e.g., any two or more of the first window 202, the second window 204, the third window 206, and/or the fourth window 208) based on the wind direction 226 and the orientation of the vehicle 102 to prevent the environmental element(s) 224 from entering the cabin 210 during the weather event of interest. For example, in certain scenarios where the wind is blowing the environmental element(s) 224 substantially onto the first side of the vehicle 102 but not the second side, the smart window application 118 may fully roll up the open window(s) of the vehicle 102 corresponding to the first side of the vehicle 102, while maintaining the open window(s) corresponding to the second side of the vehicle 102.

After performing the operation of block 1108, the example process returns to a calling function such as the example method 700 of FIG. 7.

Although the example method 718 is described in connection with the flowchart of FIG. 11, one or more other methods of implementing the example smart window application 118 may alternatively be used. For example, the order of execution of the blocks 1102, 1104, 1106, 1108 may be changed, and/or at least some operations of the blocks 1102, 1104, 1106, 1108 described may be changed, eliminated, or combined. In some examples, if a negative determination is made at block 1106, control of the example method 718 of FIG. 11 may return to block 1104, where the smart window application 118 can obtain and/or analyze updated weather information from the resource(s) 126. In such examples, the smart window application 118 is configured to detect, based on the updated weather information, a change in the weather for the location of the vehicle 102 that is indicative of the weather event of interest.

Figure 12:
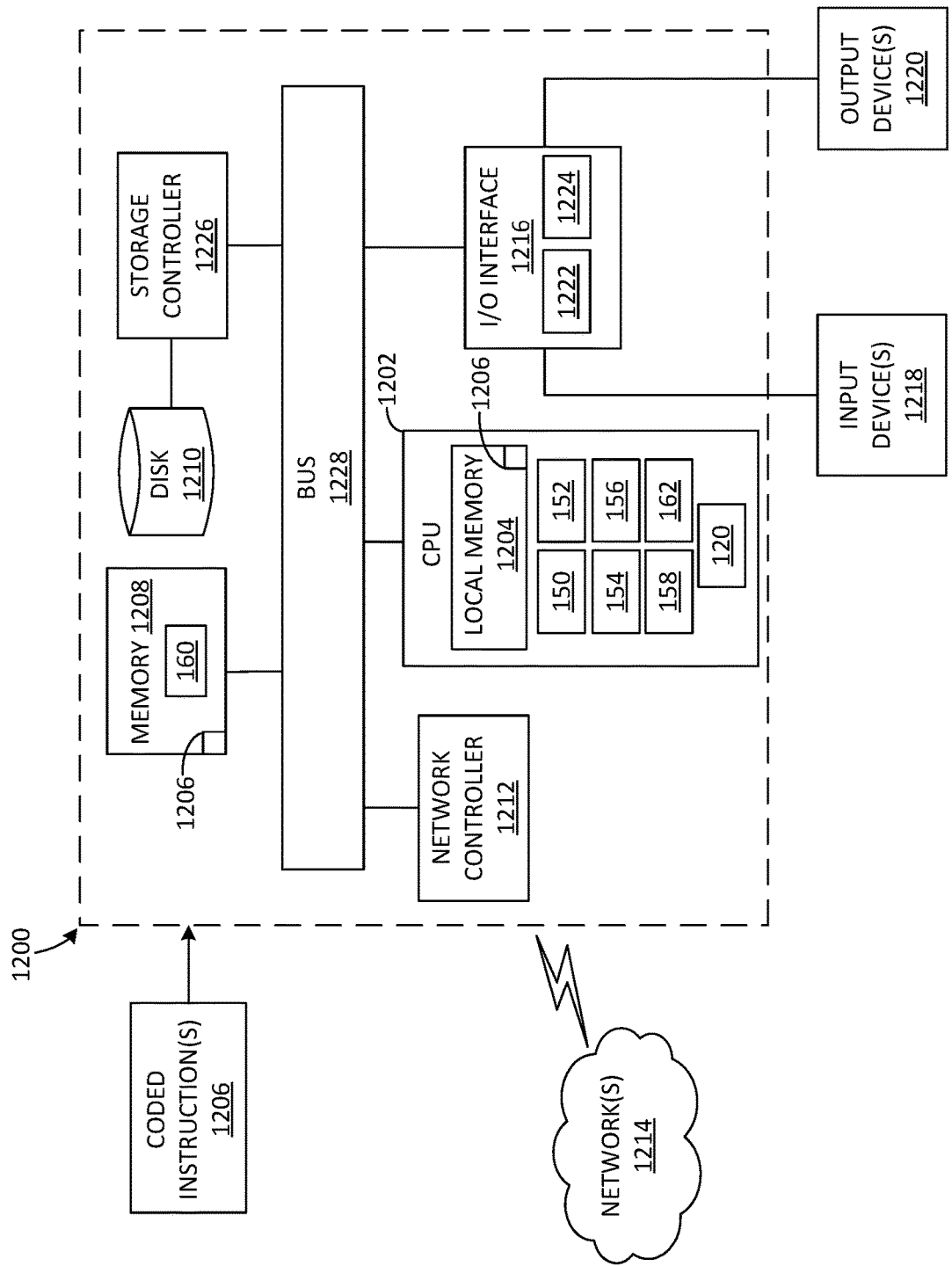
FIG. 12 is a block diagram of an example processor platform structured to execute instructions to carry out the methods of FIGS. 7, 8A, 8B, and 9-11 and/or, more generally, to implement the system shown in FIG. 1A and/or the smart window application shown in FIG. 1B.

FIG. 12 is a block diagram of an example processor platform 1200 structured to execute instructions to carry out the methods of FIGS. 7, 8A, 8B, and 9-11 and/or, more generally, to implement the system 100 of FIG. 1A and/or the smart window application 118 of FIG. 1B. For example, the processor platform 1200 can be a personal computer, a server, a mobile device (e.g., a cell phone, a smartphone, a tablet, etc.) or any other type of computing device. According to the illustrated example of FIG. 12, the processor platform 1200 includes a central processing unit (CPU) 1202 (sometimes referred to as a processor), which is hardware (e.g., one or more integrated circuits, logic circuits, microprocessors, etc.). The CPU 1202 of FIG. 12 includes a local memory 1204 such as, for example, a cache. In some examples, the CPU 1202 implements the control interface 150, the communicator 152, the data analyzer 154, the alert generator 156, the adjustment engine 158, and the vehicle interface 162, as shown in the example of FIG. 12. Additionally, in some examples, the CPU 1202 can also implement the alert dispatcher 120.

Coded instruction(s) 1206 to implement the methods of FIGS. 7, 8A, 8B, and 9-11 may be stored in a main memory 1208 of the processor platform 1200. The memory 1208 may include a volatile memory (e.g., random access memory device(s) such as Dynamic Random Access Memory (DRAM)) and a non-volatile memory (e.g., flash memory). In the example of FIG. 12, the main memory 1208 implements the example second database 160. Such processes and/or instructions may also be stored on a storage medium disk 1210 associated with the processor platform 1200, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processor platform 1200 communicates, such as a server or computer for example.

Further, the claimed advancements may be provided as a utility application, background daemon, or component of an operating system, or combination thereof, executing in conjunction with the CPU 1202 and an operating system such as, for example, Microsoft Windows 7, Microsoft Windows 10, UNIX, Solaris, LINUX, Apple MAC-OS or any other system(s) known to those skilled in the art.

The hardware elements in order to achieve the processor platform 1200 may be realized by various circuitry elements, known to those skilled in the art. For example, the CPU 1202 may be a Xenon or Core processor from Intel of America or an Opteron processor from AMD of America, or may be other processor types that would be recognized by one of ordinary skill in the art. Alternatively, the CPU 1202 may be implemented on an FPGA, ASIC, PLD or using discrete logic circuits, as one of ordinary skill in the art would recognize. Further, the CPU 1202 may be implemented as multiple processors cooperatively working in parallel to perform the instructions of the inventive processes described above.

In some examples, the processor platform 1200 of FIG. 12 also includes a network controller 1212 such as, for example, an Intel Ethernet PRO network interface card from Intel Corporation of America for interfacing with one or more networks 1214. As can be appreciated, the network(s) 1214 can be one or more public networks (e.g., the Internet), private networks (e.g., a LAN, a WAN, etc.) and/or sub-networks (e.g., a public switched telephone network (PSTN), an integrated services digital network (ISDN), etc.). The network(s) 1214 can also be wired, such as an Ethernet network, or can be wireless such as a cellular network including EDGE, 3G and 4G wireless cellular systems. The wireless network can also be WiFi, Bluetooth, or any other wireless form of communication that is known.

The processor platform 1200 of FIG. 12 includes a general purpose I/O interface circuit 1216 that interfaces and/or otherwise communicates with one or more input devices 1218 and/or one or more output devices 1220. The I/O interface circuit 1216 of FIG. 12 may be implemented as an Ethernet interface, a universal serial bus (USB), a PCI express interface, and/or any other type of standard interface.

The input devices 1218 are connected to the I/O interface circuit 1216 and may include, for example, a keyboard, a mouse, a touchscreen, a button, a microphone, a voice recognition system, a camera, and/or any other suitable device(s) for enabling a user to input data and/or commands to the CPU 1202.

The output device(s) 1220 are also connected to the I/O interface circuit 1216 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit 1216 includes a display controller 1222 such as, for example, a NVIDIA GeForce GTX or Quadro graphics adaptor from NVIDIA Corporation of America for interfacing with a display (e.g., a Hewlett Packard HPL2445w LCD monitor). Additionally, in some examples, the I/O interface circuit includes a sound controller 1224 such as, for example, Sound Blaster X-Fi Titanium from Creative, to interface with a speaker and/or a microphone.

The processor platform 1200 of FIG. 12 also includes a general purpose storage controller 1226 that connects the storage medium disk 1210 with a communication bus 1228. The storage controller 1226 may also control access to the memory 1208. The communication bus 1228 of FIG. 12 may be an ISA, EISA, VESA, PCI, etc. for interconnecting all of the components of the processor platform 1200. For example, the CPU 1202 communicates with the main memory 1208 via the bus 1228.

It will be appreciated that the systems, apparatus, and methods disclosed in the foregoing description provide numerous advantages. Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:
1. An apparatus, comprising:
    control circuitry configured to:
    obtain data associated with a vehicle that is parked;
    determine, based on the data, a status of the vehicle associated with a cabin temperature or an occupant unattended in the vehicle;

open a vehicle window via a window actuator to cool a cabin of the vehicle based on the status;
detect, based on the data, an event in an environment associated with the vehicle while the vehicle window is open;
adjust the vehicle window via the window actuator in response to the detection;
determine a dimension of an object via one or more sensors;
determine a target window position based on the dimension; and
move, via the window actuator, the vehicle window based upon the target window position.

2. The apparatus of claim 1,
wherein the object is an object of interest external to the vehicle, and
wherein the control circuitry is configured to detect the object of interest external to the vehicle via the one or more sensors and close the vehicle window if a distance between the object of interest and the vehicle is less than a threshold distance.

3. The apparatus of claim 2, wherein the control circuitry is configured to determine whether the object of interest is an authorized user of the vehicle prior to adjusting the vehicle window.

4. The apparatus of claim 2, wherein the control circuitry is configured to:
move the vehicle window to the target window position to prevent the object of interest from entering the cabin of the vehicle while the cabin is venting.

5. The apparatus of claim 1,
wherein the data associated with the vehicle includes weather information for a location of the vehicle, and
wherein the control circuitry is configured to detect a change in the weather based on the weather information and close the vehicle window to prevent environmental elements from entering the cabin.

6. The apparatus of claim 1,
wherein the data associated with the vehicle includes weather information for a location of the vehicle, and
wherein the control circuitry is configured to:
determine a wind direction based on the weather information;
determine an orientation of the vehicle relative to the wind direction;
adjust, via multiple window actuators, multiple vehicle windows based on the wind direction and the orientation to effect at least one of (a) increase airflow in the cabin and (b) prevent environmental elements from entering the cabin.

7. The apparatus of claim 1,
wherein the object is the occupant, and
wherein the control circuitry is configured to:
move the vehicle window to the target window position to prevent the occupant from exiting the cabin while the cabin is venting.

8. The apparatus of claim 1, wherein the control circuitry is configured to determine, based on the data, when a user will drive the vehicle and transmit an alert to a user device corresponding to the user at a time before the user arrives at the vehicle.

9. An apparatus, comprising:
control circuitry configured to:
detect a cabin temperature of a vehicle that is stationary via one or more sensors;
open, via an actuator, a window of the vehicle when the cabin temperature is greater than a threshold temperature;
obtain data corresponding to an environment associated with the vehicle while the window is open;
adjust, via the actuator, the window in real-time based on the data;
determine a dimension of an object via one or more sensors;
determine a target window position based on the dimension; and
move, via the actuator, the window based upon the target window position.

10. The apparatus of claim 9,
wherein the object is an object of interest external to the vehicle, and
wherein the control circuitry is configured to detect the object of interest external to the vehicle via the one or more sensors and close the window if a distance between the object of interest and the vehicle is less than a threshold distance.

11. The apparatus of claim 10, wherein the control circuitry is configured to check whether the object of interest is an authorized user of the vehicle prior to closing the window of the vehicle.

12. The apparatus of claim 10, wherein the control circuitry is configured to:
move the window to the target window position to prevent the object of interest from entering a cabin of the vehicle while the cabin is venting.

13. The apparatus of claim 9,
wherein the data corresponding to the environment includes weather information for a location of the vehicle, and
wherein, in response to determining that a weather event is occurring or likely to occur in the location, the control circuitry is configured to close the window to prevent environmental elements from entering a cabin of the vehicle.

14. The apparatus of claim 9,
wherein the data corresponding to the environment includes weather information for a location of the vehicle, and
wherein the control circuitry is configured to:
determine a wind direction based on the weather information;
determine an orientation of the vehicle relative to the wind direction; and
adjust, via multiple actuators, multiple windows of the vehicle based on the wind direction and the orientation to (a) increase airflow in a cabin of the vehicle or (b) prevent external elements from entering the cabin.

15. The apparatus of claim 9,
wherein the object is a vehicle occupant, and
wherein the control circuitry is configured to:
detect the vehicle occupant in a cabin of the vehicle via the one or more sensors; and
move the window to the target window position to prevent the vehicle occupant from exiting the cabin while the cabin is venting.

* * * * *